US011160054B2

(12) United States Patent
Kim et al.

(10) Patent No.: US 11,160,054 B2
(45) Date of Patent: Oct. 26, 2021

(54) METHOD AND APPARATUS OF OPERATION CONSIDERING BANDWIDTH PART IN NEXT GENERATION WIRELESS COMMUNICATION SYSTEM

(71) Applicant: SAMSUNG ELECTRONICS CO., LTD., Suwon-si (KR)

(72) Inventors: Yongok Kim, Seoul (KR); Saidhiraj Amuru, Bangalor (IN); Chanhong Kim, Suwon-si (KR); Yeohun Yun, Hwaseong-si (KR); Jongbu Lim, Seoul (KR); Sungnam Hong, Suwon-si (KR); Taeyoung Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 16/637,625

(22) PCT Filed: Aug. 9, 2018

(86) PCT No.: PCT/KR2018/009122
§ 371 (c)(1),
(2) Date: Feb. 7, 2020

(87) PCT Pub. No.: WO2019/031884
PCT Pub. Date: Feb. 14, 2019

(65) Prior Publication Data
US 2021/0037505 A1  Feb. 4, 2021

(30) Foreign Application Priority Data

Aug. 10, 2017  (IN) .............................. 201731028486

(51) Int. Cl.
*H04W 72/04* (2009.01)
*H04W 76/27* (2018.01)
(Continued)

(52) U.S. Cl.
CPC .......... *H04W 72/04* (2013.01); *H04L 1/0002* (2013.01); *H04W 56/001* (2013.01); *H04W 76/27* (2018.02)

(58) Field of Classification Search
CPC ..... H04W 72/04; H04W 56/00; H04W 76/27; H04W 56/001; H04W 56/0015;
(Continued)

(56) References Cited

U.S. PATENT DOCUMENTS

2016/0127095 A1   5/2016  Chen et al.
2020/0322807 A1*  10/2020 Si ........................... H04W 88/10
2021/0058949 A1*  2/2021  Kim .................. H04W 72/1268

FOREIGN PATENT DOCUMENTS

KR   10-2018-0136757 A   12/2018

OTHER PUBLICATIONS

Qualcomm Incorporated, "On PDSCH and PUSCH RE mapping", R1-1711158, 3GPP TSG RAN WG1 NR Ad-Hoc#2, Qingdao, China, Jun. 17, 2017, 6 pages.

(Continued)

*Primary Examiner* — Kyaw Z Soe
(74) *Attorney, Agent, or Firm* — Sughrue Mion, PLLC

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

16 Claims, 24 Drawing Sheets

(51) Int. Cl.
 *H04L 1/00* (2006.01)
 *H04W 56/00* (2009.01)
(58) Field of Classification Search
 CPC ....... H04L 1/00; H04L 5/0044; H04L 1/0002; H04L 5/0094
 See application file for complete search history.

(56) References Cited

OTHER PUBLICATIONS

Samsung, "On PDSCH Rate Matching for NR", R1-1710649, 3GPP TSG RAN WG1 NR, Ad-Hoc#2, Qingdao, China, Jun. 16, 2017, 4 pages.
Mediatek Inc., "Efficient Wider Bandwidth Operations for NR", R1-1704445, 3GPP TSG RAN WG1 Meeting #88bis, Spokane, US, Mar. 25, 2017, 12 pages.
NTT Docomo, Inc., "Further views on wider bandwidth operations for NR", R1-1708494, 3GPP TSG RAN WG1 Meeting #89, Hangzhou, P.R. China, May 5, 2017, 8 pages.
International Search Report (PCT/ISA/210) dated Nov. 15, 2018 issued by the International Searching Authority in International Application No. PCT/KR2018/009122.
Written Opinion (PCT/ISA/237) dated Nov. 15, 2018 issued by the International Searching Authority in International Application No. PCT/KR2018/009122.
Communication dated Jun. 24, 2020, from the European Patent Office in European Application No. 18845118.1.
Vivo, "SS block transmissions and RRM measurement in wideband CC", 3GPP TSG RAN WG1 NR Ad-Hoc Meeting #2, R1-1710374, Jun. 27-30, 2017, Qingdao, P.R. China, pp. 1-4 (4 pages total).
LG Electronics et al., "WF on PDSCH rate matching", 3GPP TSG RAN WG1 Meeting #AdHoc2, R1-1711808, Jun. 27-Jul. 1, 2017, Qingdao, China, pp. 1-2 (2 pages total).

\* cited by examiner

METHOD AND APPARATUS OF OPERATION CONSIDERING BANDWIDTH PART IN NEXT GENERATION WIRELESS COMMUNICATION SYSTEM

TECHNICAL FIELD

The disclosure relates to a next generation wireless communication system. More particularly, the disclosure relates to a method and apparatus for operating with considering a bandwidth part.

BACKGROUND ART

To meet the demand for wireless data traffic, which has increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth generation wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

DISCLOSURE OF INVENTION

Technical Problem

In the existing wireless communication system i.e. in LTE, the bandwidth of the system is limited to 20 MHz and various BW such as 1.4 MHz, 3 MHz, 5 MHz, 10 MHz, and 20 MHz are supported. In this LTE, the eNB and UE must support the same BW. However going forward for the 5G systems, considering the wide available BW in mmWave spectrum and other parts of the spectrum, there is a lot of scope for freely using the large BW. The UE and base station (gNB) need not support the same BW and variable BW capable UE may be supported in such deployments. In order to support such wider BW UE, efficient mechanisms must be studied in order to support various operations such as search space configurations, efficient resource allocation mechanisms among others.

Solution to Problem

The present disclosure is designed to address at least the problems and/or disadvantages described above and to provide at least the advantages described below. Accordingly, an aspect of the present disclosure is to provide a method and apparatus for transmitting/receiving downlink data in a next generation communication system.

In accordance with an aspect of the present disclosure, a method by a terminal is provided. The method comprises receiving, from a base station, a radio resource control (RRC) message configuring a rate matching for a physical downlink shared channel (PDSCH); identifying at least one resource element (RE) where the rate matching is performed based on the message; and receiving, from the base station, downlink data on a PDSCH without the identified at least one RE, by considering that the at least one RE is rate matched by the base station, wherein a synchronization signal block (SS block) is transmitted on the at least one RE.

In accordance with an aspect of the present disclosure, a terminal is provided. The terminal comprises a transceiver configured to transmit and receive signals; and at least one processor configured to: receive, from a base station, a radio resource control (RRC) message configuring a rate matching for a physical downlink shared channel (PDSCH), identify at least one resource element (RE) where the rate matching is performed based on the message; and receive, from the base station, downlink data on a PDSCH without the identified at least one RE, by considering that the at least one RE is rate matched by the base station, wherein a synchronization signal block (SS block) is transmitted on the at least one RE.

In accordance with an aspect of the present disclosure, a method by a base station is provided. The method comprises transmitting, to a terminal, a radio resource control (RRC) message configuring a rate matching for a physical downlink shared channel (PDSCH); performing a rate matching on at least one resource element (RE) identified based on the message; and transmitting, to the terminal, downlink data on a PDSCH without the at least one RE, wherein a synchronization signal block (SS block) is transmitted on the at least one RE.

In accordance with an aspect of the present disclosure, a base station is provided. The base station comprises a transceiver configured to transmit and receive signals; and at least one processor configured to: transmit, to a terminal, a radio resource control (RRC) message configuring a rate matching for a physical downlink shared channel (PDSCH), perform a rate matching on at least one resource element (RE) identified based on the message, and transmit, to the terminal, downlink data on a PDSCH without the at least one RE, wherein a synchronization signal block (SS block) is transmitted on the at least one RE.

Advantageous Effects of Invention

According to embodiments of the present invention, various operations with respect to the next generation wireless communication system can be enhanced.

BRIEF DESCRIPTION OF DRAWINGS

The above and other aspects, features, and advantages of certain embodiments of the present invention will be more apparent from the following detailed description taken in conjunction with the accompanying drawings, in which.

MODE FOR THE INVENTION

Figure 1:
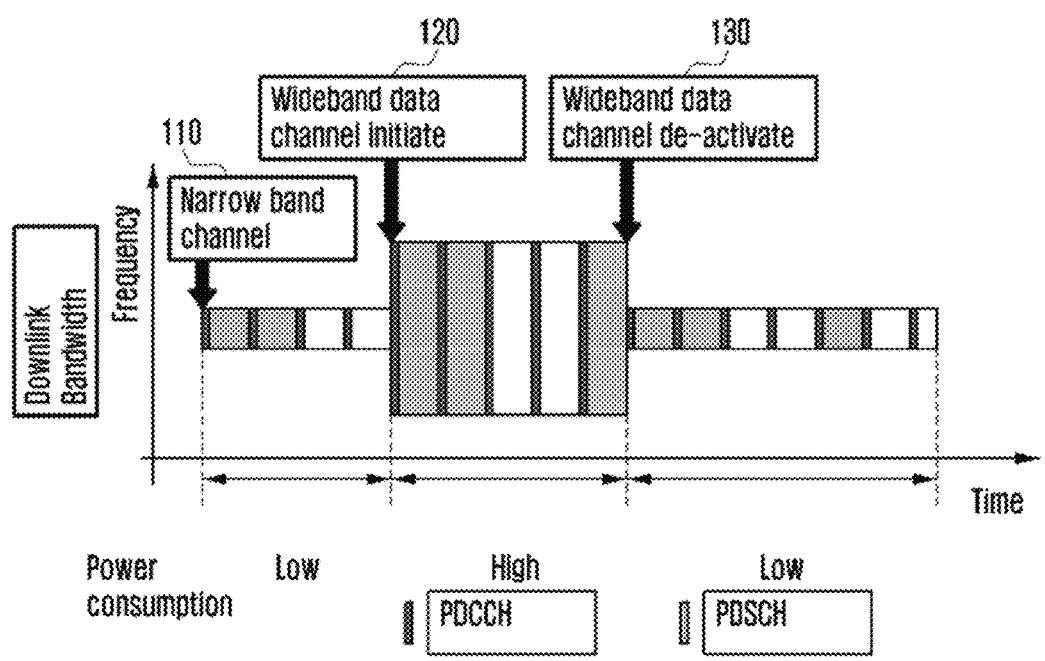
FIG. 1 illustrates a various bandwidth involved in a UE's operation.

Various embodiments of the present disclosure will be described in detail with reference to the accompanying drawings. In the following description, specific details such as detailed configurations and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness. In each drawing, the same or similar components may be denoted by the same reference numerals.

Each block of the flow charts and combinations of the flow charts may be performed by computer program instructions. Because these computer program instructions may be mounted in processors for a general computer, a special computer, or other programmable data processing apparatuses, these instructions executed by the processors for the computer or the other programmable data processing apparatuses create means performing functions described in block(s) of the flow charts. Because these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Because the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate a module, a segment, and/or a code including one or more executable instructions for executing a specific logical function(s). Further, functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term "unit" may include software and/or hardware components, such as a field-programmable gate array (FPGA) and/or an application-specific integrated circuit (ASIC). However, the meaning of "unit" is not limited to software and/or hardware. For example, a unit may be configured to be in a storage medium that may be addressed and may also be configured to reproduce one or more processor. Accordingly, a "unit" may include components such as software components, object oriented software components, class components, task components, processors, functions, attributes, procedures, subroutines, segments of program code, drivers, firmware, microcode, circuit, data, database, data structures, tables, arrays, and variables.

Functions provided in the components and the "units" may be combined with a smaller number of components and/or "units" or may further separated into additional components and/or "units".

In addition, components and units may also be implemented to reproduce one or more CPUs within a device or a security multimedia card.

The terms as used in the present disclosure are provided to describe specific embodiments, and do not limit the scope of other embodiments. It is to be understood that singular forms include plural forms unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as the contextual meanings of related technology. Unless otherwise defined, the terms should not be interpreted as ideally or excessively formal meanings. When needed, even the terms as defined in the present disclosure may not be interpreted as excluding embodiments of the present disclosure.

Herein, a base station performs resource allocation to a terminal. Examples of the base station may include an eNodeB (eNB), a Node B, gNodeB (gNB), TRP (Transmission Reception Point), a wireless access unit, a base station controller, a node on a network, etc. Examples of the terminal may include a user equipment (UE), a mobile station (MS), a cellular phone, a smart phone, a computer, a multimedia system performing a communication function, etc.

Herein, a downlink (DL) is a radio transmission path of a signal from a base station to a UE and an uplink (UL) is a radio transmission path of a signal from the UE to the base station.

The embodiments of the present disclosure may be applied to other communication systems having similar technical backgrounds or channel forms.

For the case of 5G communications, it is proposed that the UE must support bandwidth on the order of 1 GHz in a single carrier manner. In other words, without using carrier aggregation, a 5G user must support bandwidths of this order. Several challenges arise in this regard as the user must support wide bandwidth such as RF, power consumption, scheduling etc. Since a user need not always support such wide bandwidth, the concept of 1st and 2nd RF bandwidth were introduced. However the goal is to avoid user from monitoring wide bandwidth all the time as it is not power efficient. But however, there should be ability so configure users for such wide bands to support very high data rate requirements. Furthermore, such wide bandwidth is available in above 6 GHz bands and hence can be used effectively. In this invention, we discuss the various bandwidth adaptation aspects for the 5G and future wireless systems. A FIG. 1 is shown for explanation purposes where the various bandwidth (110, 120, 130) involved in the UE operations is shown.

Several aspects of this wideband operation such as configuring search space locations, supporting MU-MIMO for different users with different bandwidth capability sizes, bandwidth indication granularity, resource block group size, PRB bundling granularity, bandwidth configurations etc. have to be addressed. A generic term known as Bandwidth Part (BWP) is defined which indicates a set of contiguous PRBs in frequency domain which are configured for a user. Resource allocation will be done within a BWP. Several BWP may be configured to a user but only one will be activated at a given time instant. Within the BWP, various issues mentioned above have to be addressed since each BWP is configured in a UE specific manner. Furthermore, when different users are considered for the case of supporting MU-MIMO in the downlink, the sizes of the BWP supported by each user must also be accounted for as it impacts the pre-coding design, the channel and interference estimation as a result of the same etc. BWP is a concept which does not need any RF involvement and it is a layer-1 concept. Multiple BWP may be configured and activated to a UE and this entails new operations regarding monitoring timeline, BW sizes supported etc. These above mentioned issues will be described hereinafter in detail.

Resource Allocation Considering BWP

Figure 2:
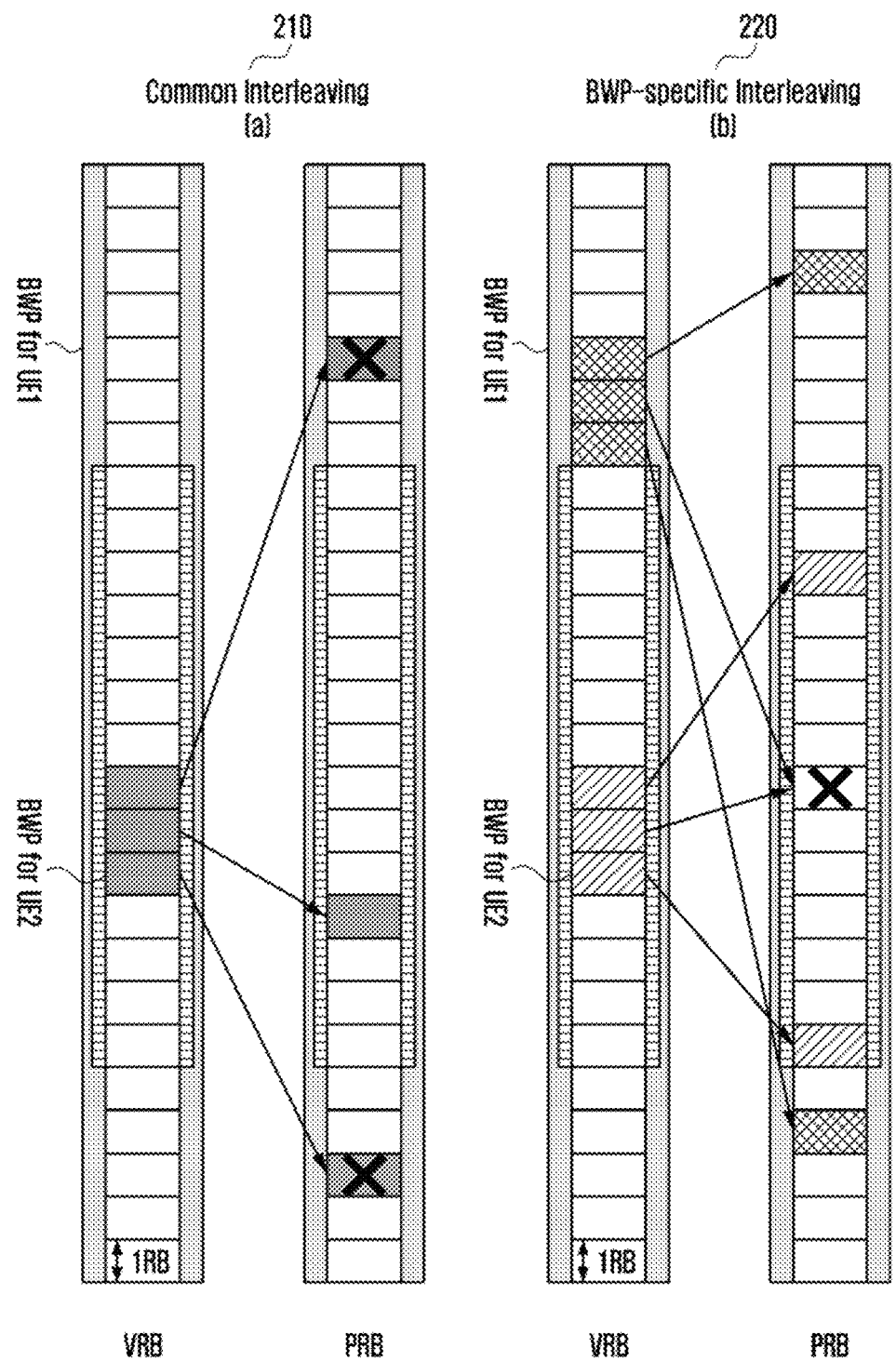
FIG. 2 illustrates an embodiment of interleaving scheme according to the proposed invention.

FIG. 2 illustrates an embodiment of interleaving scheme according to the proposed invention. Considering UE-specifically configured BWPs, the following two solutions may be considered in order to adopt downlink (DL) resource allocation (RA) type 2 with distributed VRB-to-PRB mapping which was already specified in LTE as shown in FIG. 2.

Common Interleaving (210): All BWPs/UEs share single interleaving
  Cons: Interleaved VRBs cannot be confined within configured BWP
BWP-specific interleaving (220): Interleaving is generated within each configured BWP
  Cons: PRB collision between different BWP-specific interleaving If common interleaving is performed for all UE as shown in figure above, it is seen that the VRB-to-PRB mapping may force the PRBs of one UE to be located outside the actual BWP active for this user which cannot happen as the user must operate only within its active BWP. If BWP-specific interleaving is supported, then collisions can happen since independent interleavers may be used for different users without any coordination. Hence, some unified mechanisms are proposed below to tackle the issues. Similar or same mechanisms can be adopted for uplink (UL) resource allocation if distributed mapping is used for the case of UL.

Option-1: Group Based BWP-Specific Interleaving

Figure 3:
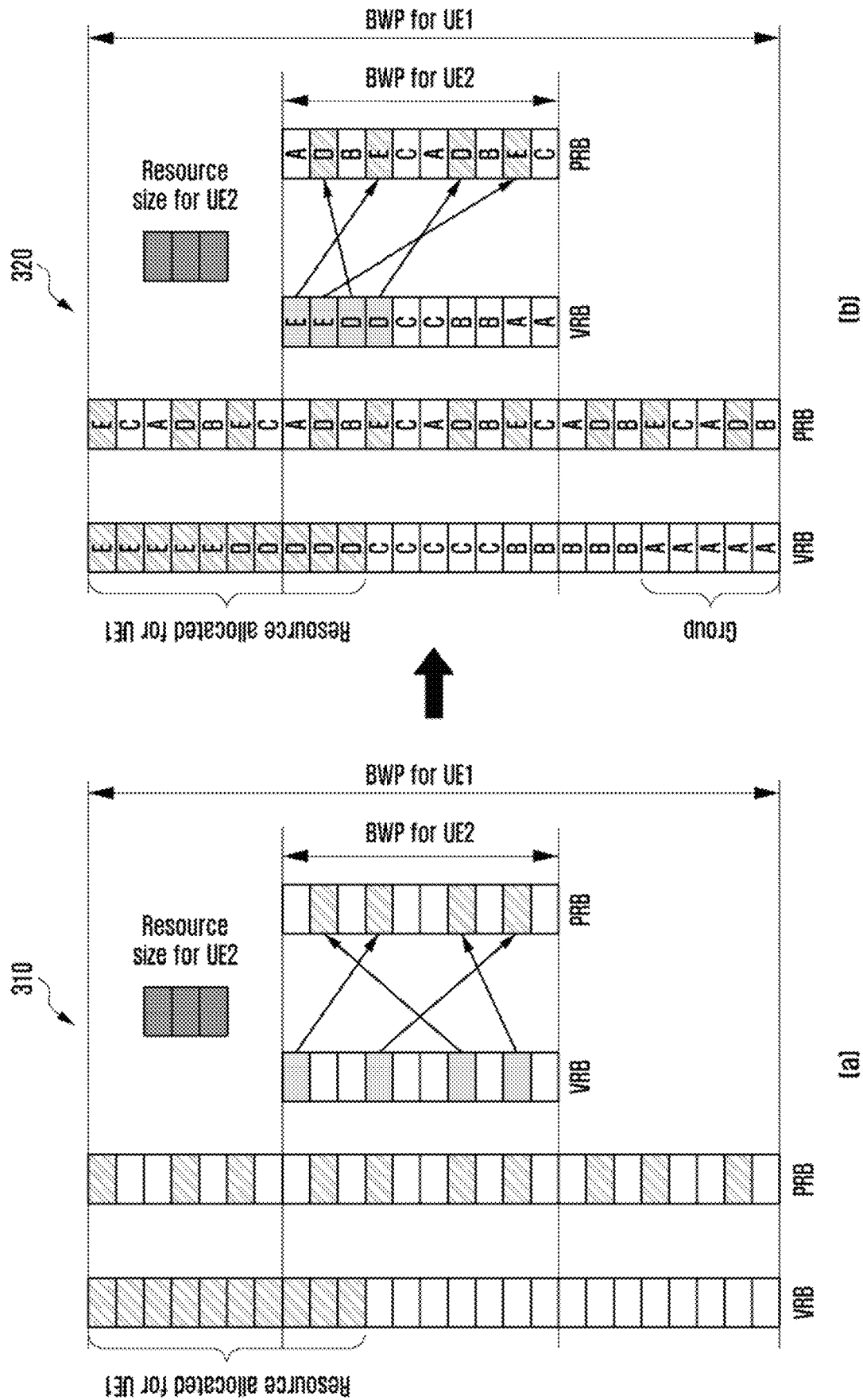
FIG. 3 illustrates another embodiment of interleaving scheme according to the proposed invention.

FIG. 3 illustrates an embodiment (option 1) of interleaving scheme according to the proposed invention. Since RA-type 2 invented to reduce signaling overhead needs a chunk of contiguous resource blocks to be allocated in VRB domain, if BWP-specific interleaving which is independently generated per BWP is used, VRBs allocated for other UEs are scattered within BWP for some UE as shown in FIG. 3. Thus, contiguous VRBs larger than resource block size to be allocated may not be found for the UE. It may lead to degrade the flexibility of scheduling and waste frequency resource from gNB perspective (310). To resolve the scattered VRB issue for BWP-specific interleaving, group-based BWP-specific interleaving is proposed. For this technique, three conditions are given to design the interleaving as follows:

Condition-1) For all PRBs within DL or UL system BW, distributed PRBs are grouped into disjoint M groups and the grouping is common for all UEs.
Condition-2) For all VRBs within each BWP, contiguous VRBs are grouped into disjoint M groups.
Condition-3) Per BWP, the number of VRBs is equal to the number of PRBs belonging to the same group Under above mentioned conditions, group based BWP-specific interleaving consisting of one-to-one VRB-to-PRB interleaving happens within each group is carried out.

One way to implement the interleaving satisfying with above conditions is to utilize block interleaving structure (320). Although block interleaving is already well-known and widely used, in order to apply to group based BWP-specific interleaving, several constraints should be taken into account. In case of block interleaving with row-by-row written and column-by-column read out, a column can be regarded as a group. Thus, although it was designed in LTE that the number of columns is associated with the total number of VRBs, it is proposed that regardless of respective BWP size, all BWP-specific block interleavers must have M columns at a given time instance. Moreover, when the number of VRBs may not be a multiple of M in a BWP, condition-1 may not hold according to where nulls are inserted as well. Therefore, to keep the condition-1, it is proposed to force to insert nulls always from last column of the last row. Details and figure to generate the interleaving are described below.

Figure 4:
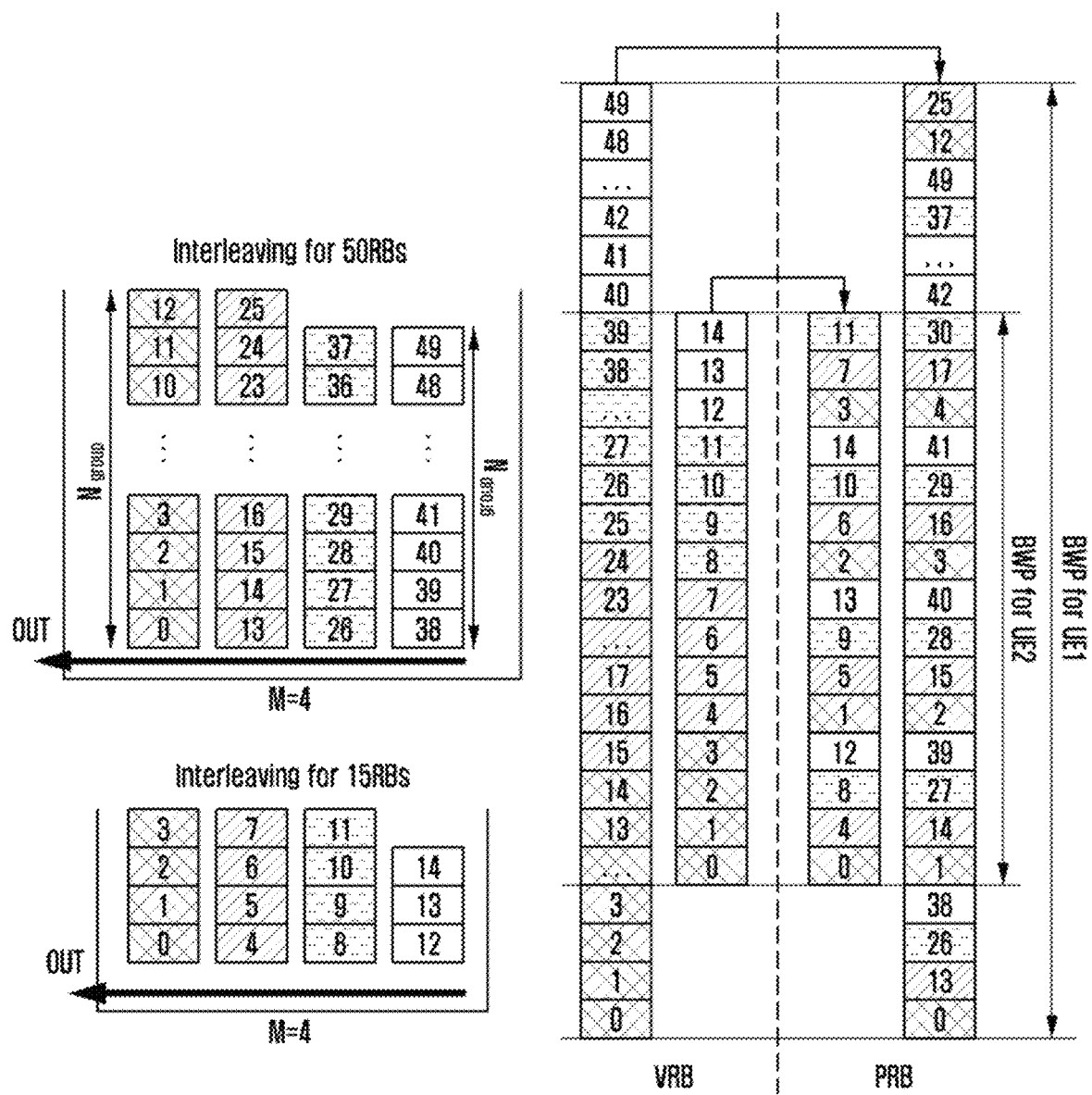
FIG. 4 illustrates another embodiment of interleaving scheme according to the proposed invention.

FIG. 4 illustrates another embodiment of interleaving scheme according to the proposed invention. It is assumed that both VRB and PRB indexing are performed from bottom frequency to top frequency without loss of generality. When the number of VRBs within a BWP is denoted as $N_{VRB}^{BWP}$, the VRB number $n_{VRB}=0, \ldots, N_{VRB}^{BWP}-1$ is interleaved to PRB number $n_{PRB}$ as equation 1:

$$n_{PRB}(n_{VRB}) = \begin{cases} m(n_{VRB} \bmod N_{group}) + \left\lfloor \frac{n_{VRB}}{N_{group}} \right\rfloor, & n_{VRB} < (M - N_{std})N_{group} \\ M(n'_{VRB} \bmod N'_{group}) + \left\lfloor \frac{n_{VRB}-1}{N'_{group}} \right\rfloor, & \text{Otherwise} \end{cases} \quad [\text{equation 1}]$$

where $N_{group} = \left\lceil \frac{N_{VRB}^{BWP}}{M} \right\rceil$, $N'_{group} = N_{group} - 1$, $N_{soft} = MN_{group} - N_{VRB}^{BWP}$, and $n'_{VRB} = n_{VRB} - N_{group}(M - N_{soft})$ The number of groups M may affect between interleaving performance and scattered VRB interference. If M is increased, more distributed allocations can be possible, but interleaving performance is reduced. Therefore, the number of groups M can be fixed as well as configured via system information, RRC, or (group-)common PDCCH. The procedure is shown in FIG. 5 below to configure M.

Figure 5:
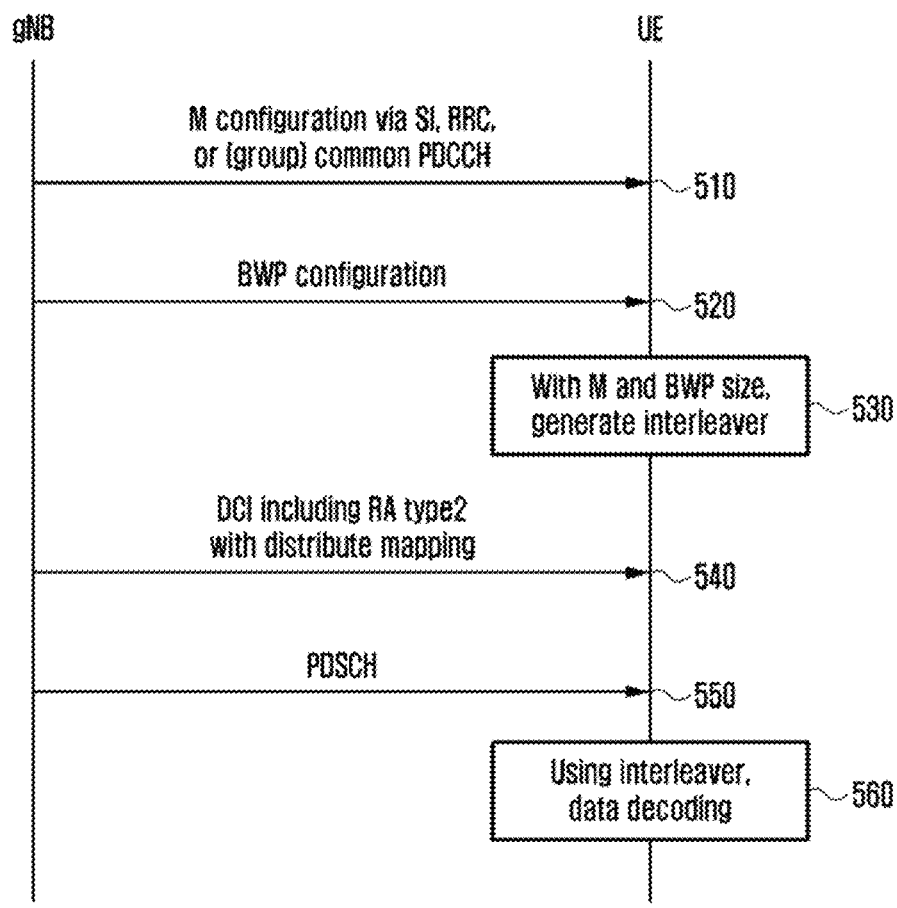
FIG. 5 illustrates an embodiment of allocating resources according to the proposed invention.
Figure 6:
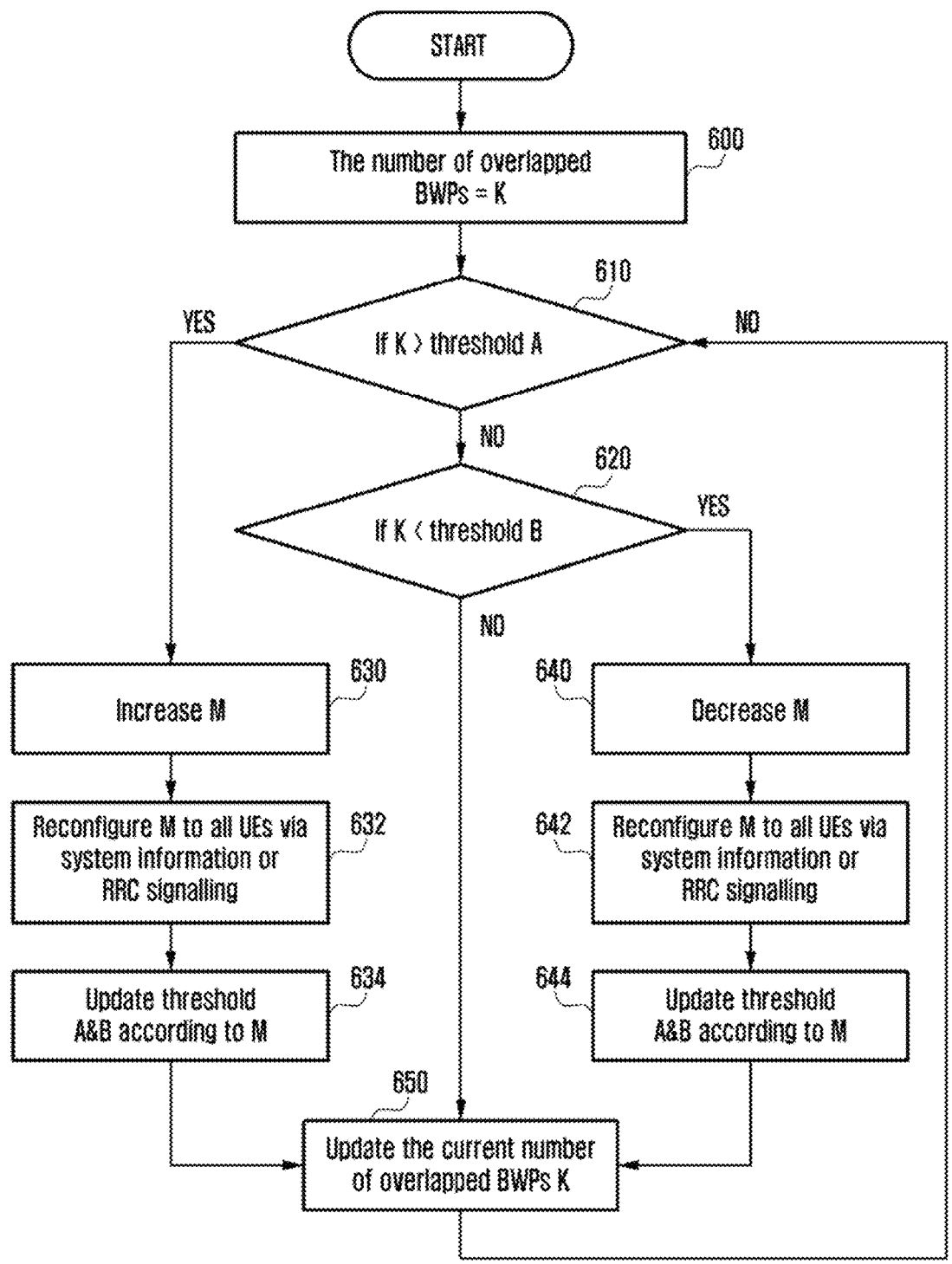
FIG. 6 illustrates another embodiment of allocating resources according to the proposed invention.

FIG. 5 illustrates an embodiment of allocating resources according to the proposed invention. A gNB configures the number of groups M for the UE via SI (system information), RRC signaling, or (group-)common PDCCH (510). And, the gNB also configures a BWP for the UE (520). By the configured M and BWP, the UE generates an interleaver to be used within the BWP (530). After transmitting a DCI (downlink control information) including RA type 2 with distribute mapping to the UE (540), the gNB transmits scheduled data on a PDSCH (physical downlink shared channel) (550). The UE decodes the received data by using the generated interleaver (560). The following FIG. 6 shows a gNB operation to decide appropriate M to be configured. FIG. 6 illustrates another embodiment of allocating resources according to the proposed invention. The gNB determines the number of overlapped BWPs K for the value M (600) and compares the K with a predetermined threshold value A (610). If K>A, the gNB increases the number of groups M (630) and reconfigures the updated M to all UEs via SI or RRC signaling (632). And threshold values A and B are updated according to the updated M (634). However, If K<=A, the gNB compares the K with another threshold B (620). If K>=B, the gNB updates the current number of overlapped BWPs K (650). If K<B, the gNB decreases the number of groups M (640) and reconfigures the updated M to all UEs via SI or RRC signaling (642). And the threshold values A and B are updated according to the updated M (644).

Figure 7:
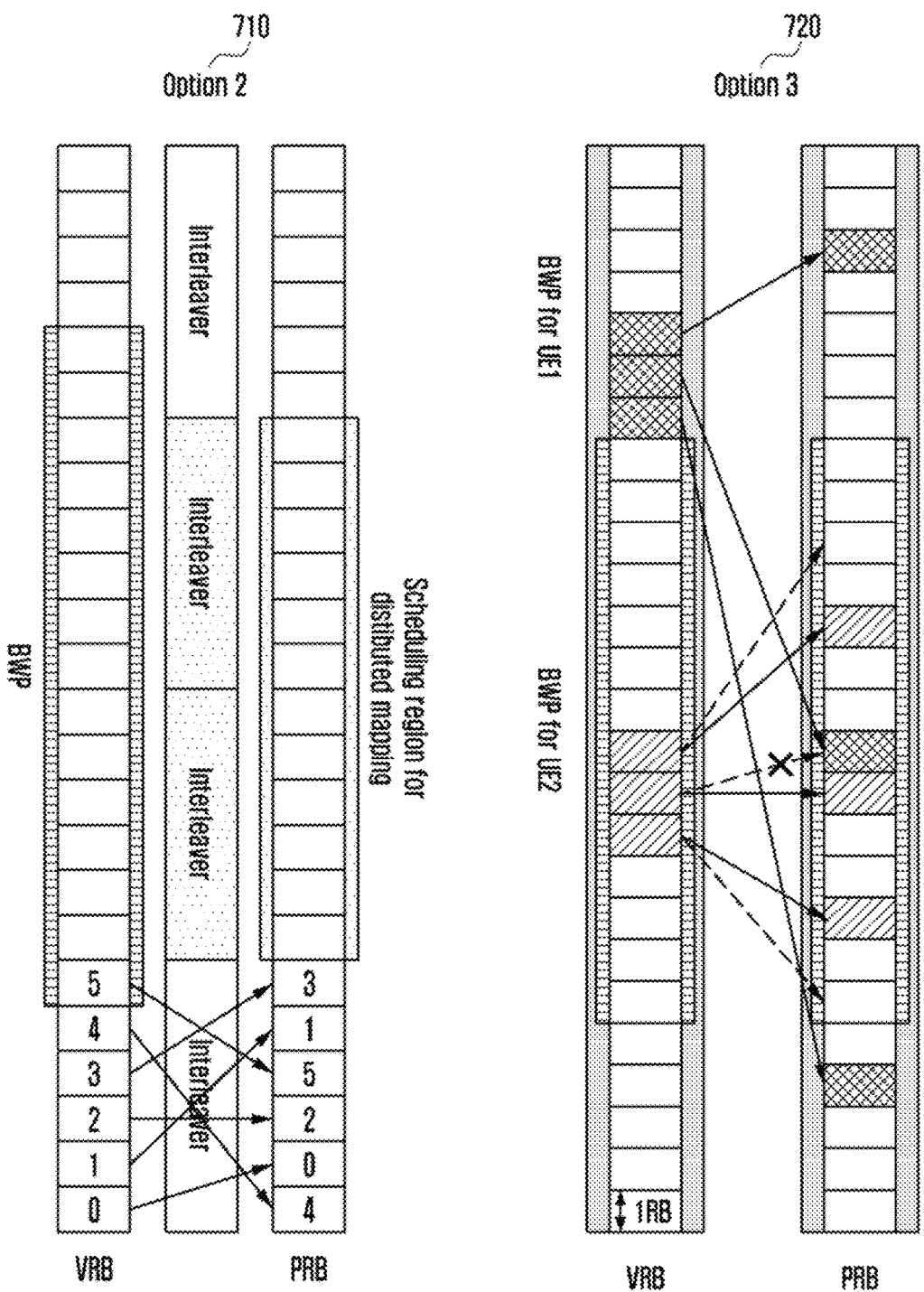
FIG. 7 illustrates embodiments of interleaving schemes according to the proposed invention.

Option-2: Common segmented interleaver
  If small size of segmented interleaver, frequency diversity is degraded
  If large size of segmented interleaver, some small BWP cannot contain the interleaver
  Segmented interleaver size may be configured by SI, or RRC
  No additional indication
Option-3: BWP-specific multiple interleavers
  Multiple BWP-specific interleaver configuration to UE
  If collision happens, NW use another interleaver, then indicate it to UE
  Can provide DoF for scheduling FIG. 7 illustrates embodiments (option 2-710 and option 3-720) of interleaving schemes described above.

Figure 8:
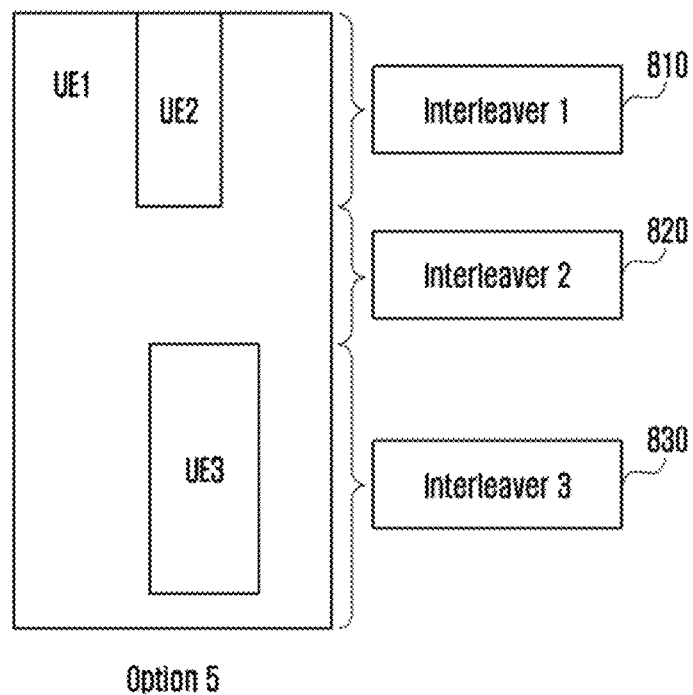
FIG. 8 illustrates another embodiment of interleaving scheme according to the proposed invention.

Option-4: BWP-specific interleaving as a function of slot number (similar to search space design)
  Interleaver is changed according to slot number
  If collision happens at n-the slot, no collision may happen at n+1-th slot
  Can provide DoF for scheduling
  No indication (Pre-defined interleaver)
Option-5: Support different interleavers for one UE within its BWP i.e., BW region specific interleaving and support multiple interleavers for wideband UE. This is similar to BW region specific PRG size definition.
  Within BWP of UE 1, use common interleaver—based on C-RNTI or some UE_ID like UE specific search space
  Outside BWP of UE 1 (but within the BWP of another UE) use a different interleaver
  To reduce signaling overhead, a set of interleavers can be defined and the interleaver index be sent to the UE
  Signal PRB start; PRB stop index and the interleaver index to the UE FIG. 8 illustrates another embodiment (option 5) of interleaving scheme according to the proposed invention. Various interleavers (810, 820, 830) are supported for the UE 1 and each of the interleavers (810, 820, 830) is defined for a specific BW region.

Option-6: Avoid distributed mapping/DL resource allocation type-2 when overlapping BWP exist
  Since defining interleavers can get complicated when more than 2 users BWP overlap i.e., if UE1, UE2 and UE3 BWP are overlapping; the gNB may take a decision to avoid distributed mapping in such cases.
Option-7: When overlapping may occur (as gNB knows about overlap); signal an offset in terms of PRBs to a UE in case gNB identifies that the used interleavers are causing an overlap/collision between the users. In other words, after VRB-PRB mapping done by gNB, if it identifies there is a potential collision across users, signal an offset to be used by a UE for its final mapping.
  Offset=0 means continue using the same RB allocations after interleaving. Offset=+1 (−1) means shift by 1 PRB up (down) in frequency. It can be some length of bits defined to support distributed mapping.

Each of the embodiments above can be indicated to the UE by the gNB via UE specific signaling—via RRC/L1/S1. L1 signaling is dynamic and can support efficient MU-MIMO techniques. Different options may be used in different slots to randomize the interference, channel impacts and gain benefits of all possible options.

Activation/De-Activation of BWP

RRC signaling based activation and de-activation is supported for 5G systems as it is naturally extendable from configuration to activation mechanisms. Between DCI and MAC mechanisms, there is a tradeoff between the signaling reliability of MAC versus fastness of DCI-based signaling. Among MAC and DCI, DCI signaling can be preferred for BWP activation. Although a DCI is missed, some fallback behaviors can be mentioned, Even in LTE when a DCI is missed, some timers are activated based on which the UE monitors some fallback DCI. Similar behavior may be defined. Specifically, the following behavior may be defined for the UE—
  If DCI missed; after timer1 expiry go back to initial BWP where the UE existed before
  If nothing found i.e., no DCI found after timer2; go back to default BWP which is configured by the gNB to the UE Hence a DCI mechanism along with timer behavior can be used for activating BWP in 5G systems and to get full benefits of the BWP tuning/re-tuning and BW adaption. A time-pattern based mechanism may also be supported for the BWP activation mechanisms. In here, a time pattern similar to SPS (semi-persistent scheduling)/DRX (discontinuous reception) mechanism and avoids much signaling. If time pattern is missed, then the UE will go to default BWP. If some conflict happens between the time pattern and the DCI based signaling, then the UE follows the DCI based signaling with higher priority.

The time pattern can be with respect to slot timing/subframe timing/SFN-based/SS block timing as a reference etc. An event-based activation of BWP seems attractive rather than keeping a wider BWP active when it is not needed. An OnDuration timer may be defined to decide how long a BWP which is wide is turned no and an Inactivity-Timer after which the UE moves to narrow BWP after some period of inactivity.

Figure 9:
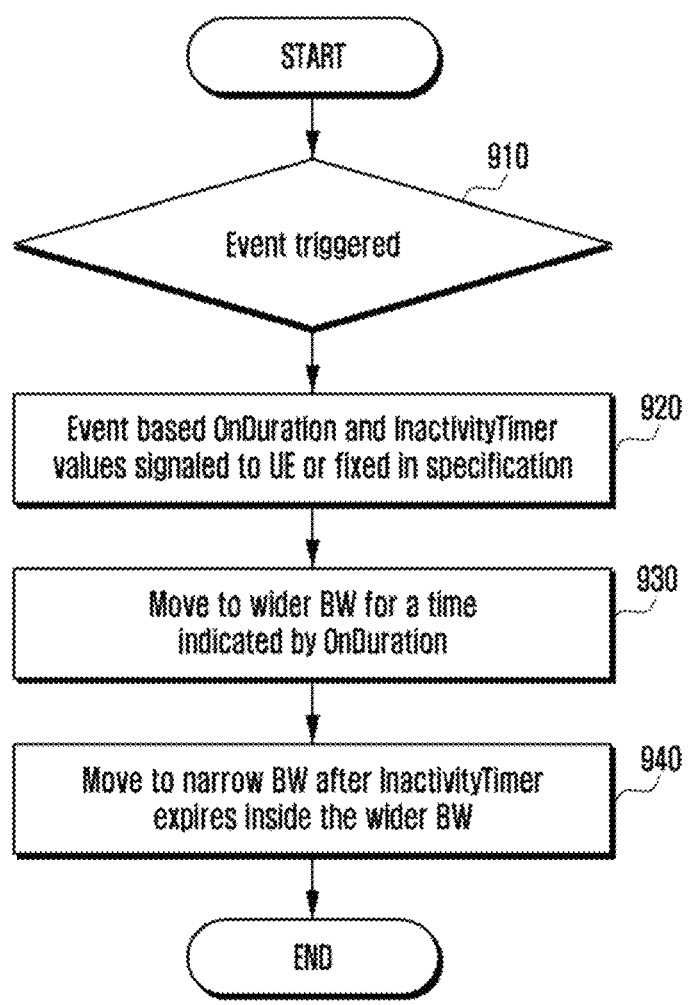
FIG. 9 illustrates an embodiment of activation/deactivation of a bandwidth part according to the proposed invention.

FIG. 9 illustrates an embodiment of activation/deactivation of a bandwidth part according to the proposed invention. When an event is triggered (910), gNB signals event based OnDuration and InactivityTimer values to UE. Or, the values can be fixed in specification (920). The UE moves to wider BW for a time indicated by OnDucation from the gNB (930), and the UE moves to narrower BW after Inactivity-Timer indicated from the gNB expires inside the wider BW (940).

MU-MIMO Impacts

The PRG size may depend on RBG (resource block group) size, or other values based on bandwidth part, and/or scheduled bandwidth and/or UE capability. In LTE, the PRG size was defined based on the RBG sizes as it was more appropriate to define the pre-coding vectors. A similar design may be followed in NR. Since the RBG size may depend on the configured BWP sizes (as indicated earlier and may be indicated via DCI), the PRG size may directly or indirectly depend on the configured BWP size. Of course it must be taken care to consider the case of multiple BWP configurations. Furthermore, when a WB (wideband) and NB (narrowband) UE are multiplexed for MU-MIMO purposes, the PRG sizes may be defined commonly for both these UEs and be indicated via UE specific signaling. For instance, in LTE when the RBG size was 3, the PRG size 3 was chosen over 2 to have scheduling flexibility. Similarly, the PRG sizes of both WB and NB UE must be taken into account and the appropriate PRG size may be chosen and indicated. The gNB may ensure that the pre-coding vectors are common across the two users such that channel estimation can be done. For instance if User 1 uses PRG size X and user 2 uses PRG size Y, then precoding for MU-MIMO can be defined over an allocation of size of the equation 2 below in order to ensure reliable channel and interference estimation over LCM(X,Y) PRG.

$$\text{Precoding Granularity}=LCM(X,Y) \qquad \text{[equation 2]}$$

This design can be followed for the case of MU-MIMO across different numerologies or MU-MIMO across users with different BWP sizes. Other methods can be to support the PRG size based on the lowest PRG size supported by each user or the following equation 3.

$$\text{Precoding Granularity}=\min(X,Y) \text{ or } \max(X,Y) \text{ or } X \text{ or } Y \qquad \text{[equation 3]}$$

Another solution could be wherein a common PRG size is used only within the BW region where there is an overlap between the multiple users and then in other regions different PRG sizes may be used. This can help when UE1 BWP partially overlaps with 2 different users UE2 and UE3 each having different BWP sizes as shown in FIG. 10.

Figure 10:
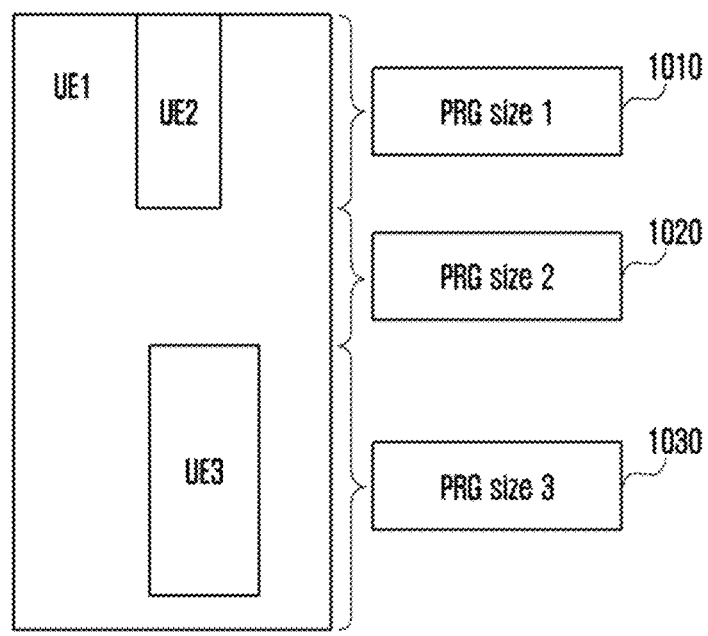
FIG. 10 illustrates an embodiment of configuring different RGB sizes for users according to the proposed invention.

FIG. 10 illustrates an embodiment of configuring different RGB sizes for users according to the proposed invention. In FIG. 10, different PRG sizes (1010, 1020, 1030) are used for each BWP regions.

Different PRG sizes can be used in a BW region specific manner So interference and channel estimation can be done in a BW region specific manner within the BWP of each UE. PRG size 3 is common for UE 1 and UE 3 within their overlap region. Similarly PRG size 1 is common for UE 1 and UE 2 within their overlap region. Therefore, the following equation 4 can be defined.

$$\text{Precoding Granularity}=\text{function}(\text{BW region location,} \text{ number of users in BW region, BW region size}) \qquad \text{[equation 4]}$$

These can be explicitly indicated to the UE via gNB signaling via L1/RRC i.e. UE specific signaling.

SS and BWP Relationship

By definition, a BWP will have only one numerology throughout all of its RB's. This active BWP may or may not contain an SS block. While a UE may be activated with multiple BWPs, it may be possible that one of these contains SS block or none may contain the SS block. Depending on whether or not the activated i.e., monitored BWP have SS block, UE will be configured for retuning to support measurements of the same. The following issues may arise in terms of the configuration of the SS block and the BWP for a UE.

For example, SS block has a numerology of 30 kHz, and located in RB index 10~15. Assume that BWP1 is configured from RB index 0~9 (not including SS blocks), and BWP2 is configured from RB index 0~30. (i.e., including SS blocks). It should be determined that a BWP1 be activated with SCS=15 kHz or 30 kHz. Also, whether BWP2 be activated with SCS=15 kHz or 30 kHz also needs to be determined. If so, how to treat RB index 10~15, is Rate-matching necessary, and SS blocks can be a part of BWP should be determined. This issue is shown in the FIG. 11.

Figure 11:
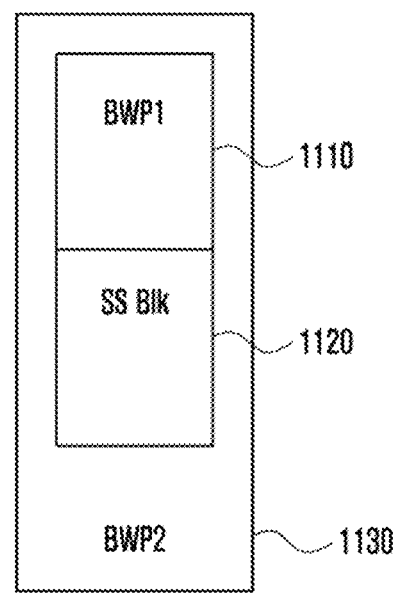
FIG. 11 illustrates an embodiment of a relationship between a synchronization signal and a bandwidth part according to the proposed invention.

FIG. 11 illustrates an embodiment of a relationship between a synchronization signal block (SS block, 1130) and a BWP 1 (1110) and BWP 2 (1120) according to the proposed invention.

This issue also depends on the UE capability information whether or not it can support multiple numerologies simultaneously. Then it can support SS block and the data/control channels with different numerology within a same BWP. Else, from one UE perspective the SS block is configured with numerology 1 and for another UE perspective the data/control may be configured with a different numerology. Both will be sent at a same time instant. The slot structure for each of them assumed will be different due to different numerology. For example, 16 symbols of 240 kHz numerology corresponds to 1 symbol of 15 kHz numerology. Accordingly the gNB can schedule the users or even a single user if it can support it.

The UE reading PDSCH must be indicated the location of the SS block (if partial overlap occurs, then more indications are needed indicating how much of SS block is overlapping with the mentioned BWP, hence it is easier if the entire SS block is within the BWP and the gNB schedules/configures BWP in such a manner; however if need arises partial overlap with SS block BW is also allowed with appropriate signaling indicated to the UE about the number of RBs of SS block overlapping with the PDSCH.) These are shown in FIG. 12.

Figure 12:
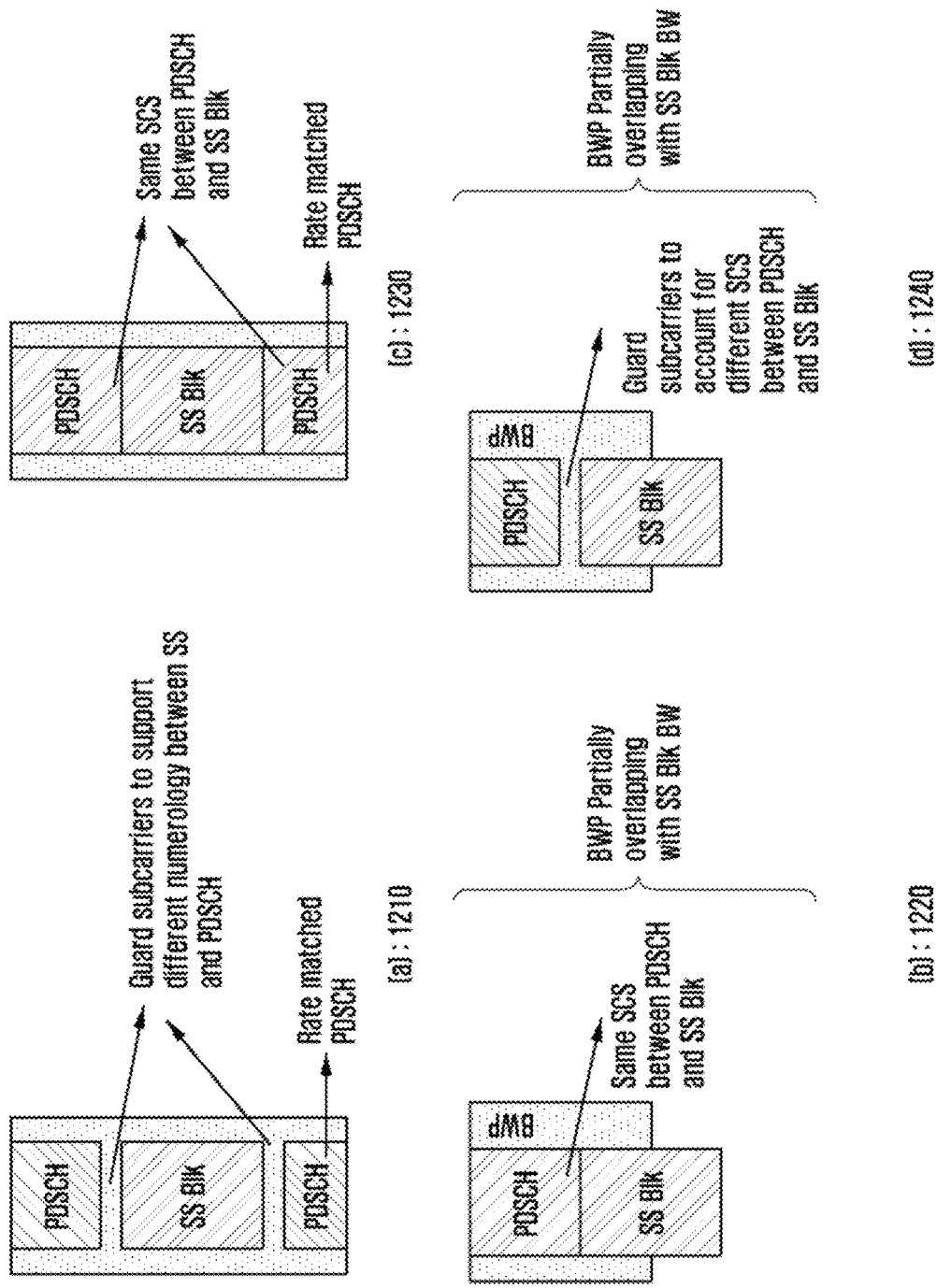
FIG. 12 illustrates another embodiment of a relationship between a synchronization signal and a bandwidth part according to the proposed invention.

FIG. 12 illustrates another embodiment of a relationship between a synchronization signal and a bandwidth part according to the proposed invention.

BWP1 can be activated with 30 kHz easily without guard band requirements. BWP1 with 15 kHz may need guard band configuration to avoid potential leakages between different numerologies. BWP2 can be activated with 30 kHz by default. For 15 kHz, the gNB must take care of doing filtering, have 2 FFT blocks to generate data as such simultaneously i.e., supporting 2 numerologies together etc. This is gNB implementation details.

When a BWP has same SCS as SS block (either fully included (1220) or partially included (1230)), no issues are seen. Either a UE is rate matched around the SS block if it doesn't need the SS block or it will use the SS block for measurements while PDSCH is FDM'ed in the left over region for which rate matching may not be needed when it can be indicated to UE via distributed resource allocation mechanisms (for example, this can be done during RRM measurement gaps where UE uses SS block for RRM measurements and also receive some PDSCH in the remaining BW i.e., minimum UE BW minus SS block BW).

When contiguous resource allocation mechanisms are used, then explicit indication of the rate matching resources must be provided. These are separate resources to indicate where the UE must do rate matching. Note that rate matching of a PDSCH around PBCH region has been allowed in LTE, so that the network can transmit PDSCH in both the partial slot (in the PBCH BW) and full slot (in the non-PBCH BW) without involving new scheduling indication method and/or without introducing any scheduling restriction. In legacy LTE, no indication was necessary as there is a single PBCH region in a cell. In 5G, a semi-static or a cell-specific indication of the SS block resources could be sufficient for UE to rate match the PDSCH around the SS block. This is needed because 5G can support multiple SS blocks. Rate matching and resource allocation can be a) separately handled b) jointly handled. For separate handling, separate resources must be allotted for indication of this rate matching. For joint indication, improved resource allocation mechanisms are needed.

When a BWP can have different SCS compared to SS block (1210, 1240) but the UE will not monitor the SS block (simultaneously) when it uses this BWP (considering a UE can monitor only one SCS at a time), can be possible by ensuring that there is no leakage between the multiple numerologies and the guard sub-carriers are either indicated to the UE or indicated as reserved resources or avoided in the resource allocations mechanisms.

Hence, the following decisions and indications must be taken by gNB and indicated to UE:
  whether BWP and SS block overlapping or not
  whether BWP and SS block have same numerology
  whether Rate matching needed around SS block
  whether Guard subcarriers to be indicated when BWP and SS block have different numerology This decision must be done for PDCCH, PDSCH, both for broadcast and unicast ones.

Figure 13:
FIG. 13 illustrates an embodiment of configuring a periodicity of rate matching resource according to the proposed invention.

For rate matching following information is needed for the UE:
  Actually transmitted number of SS blocks per SS block location (among multiple SS blocks)
  Total number of SS blocks locations (in terms of frequency location) within a bandwidth region configured for the UE
  Periodicity value per SS block (at a given frequency) within a BW region configured for the UE
  Periodicity values for the rate matching resources that match the periodicity of the SS block (s) both for within serving cell and for neighbor cell measurements This indication can be via RMSI/RRC signaling/via RRC connection setup/DCI. RRC signaling seems sufficient as things may only change in semi-static manner. The RRC signaling format may be represented as FIG. 13. FIG. 13 illustrates an embodiment 1310 of configuring a periodicity of rate matching resource according to the proposed invention.

Apart from these, the following factors also impact the rate matching for PDSCH—DMRS (demodulation reference signal) locations for PDSCH—one symbol or 2 symbols front-loaded in OFDM symbol 2 or 3 for slot-based scheduling; DMRS location for PDSCH in mini-slot scheduling—1st OFDM symbol of scheduled data location will also be indicated to UE explicitly to account for rate matching. In addition, the SS block mappings have been agreed to be in OFDM symbols 2, 3, 4, 5 or 4, 5, 6, 7 depending on the numerology and patterns allowed. In such cases, these OFDM symbols must be taken into account for the case of rate matching as well. The PSS and SSS are 12 PRBs inside an SS block while SS block entire BW is 24 PRBs. If the 12 PRBs of the SS block will be used for the data can also be indicated to UE and will impact the rate matching indications.

Multiple Active BWP

Figure 14:
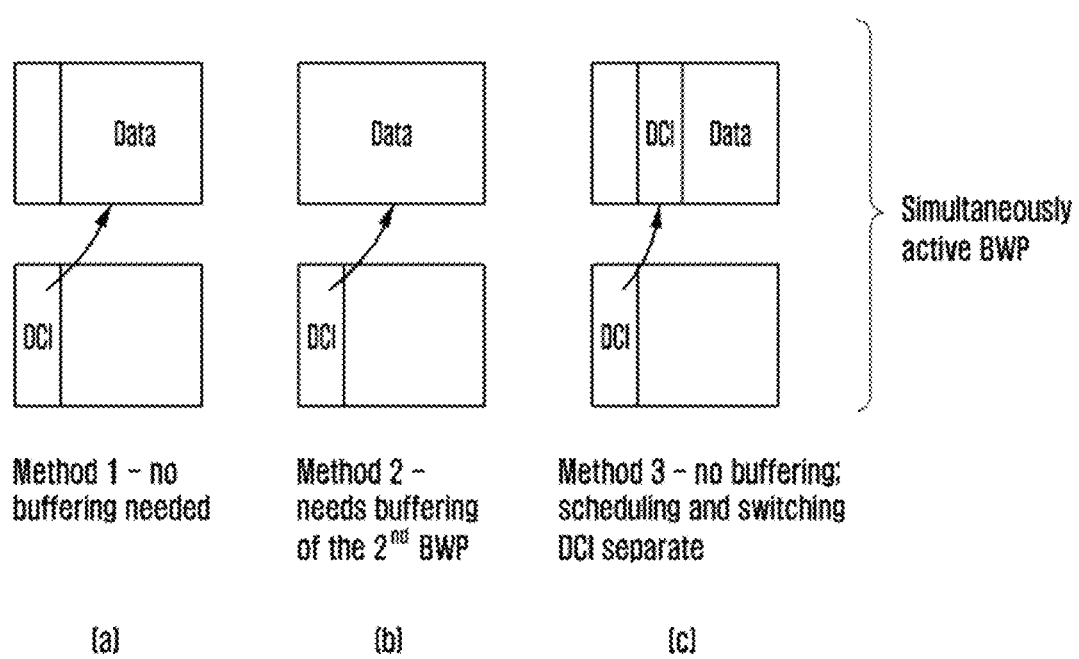
FIG. 14 illustrates an embodiment of activating multiple bandwidth parts according to the proposed invention.

FIG. 14 illustrates embodiments of simultaneously activating multiple bandwidth parts according to the proposed invention. For the case when a UE can support multiple numerologies the above situations can be supported for allowing multiple simultaneously active BWP for a UE. For multiple active BWP, cross BWP scheduling is allowed for future wireless systems (FIG. 14 (*a*)). CSS is there in one of them and is configured by NW and indicated by RRC. USS is present in each of them—can have scheduling/switching DCI—either combined or separate. The design for combined or separate DCI for scheduling and switching is discussed later.

If both BWP are received together, in other words if both BWP are activated at the same time instant, then buffering is needed so that the UE can receive data on other BWP also and allow for the other BWP to carry data (FIG. 14 (*b*)). This depends on UE capability of buffering data from other BWP and must be indicated to the gNB via RRC connection setup. After DCI decoding on one BWP and getting indication of PDSCH on other BWP, UE recover data from buffer which is possible if data starts after end of DCI reception. Therefore number of simultaneously active BWP depends on UE capability, DCI design, buffering ability etc. In method 3 (FIG. 14 (*c*)), it is shown that the switching and scheduling DCI are in different BWP. In such cases, each DCI must be indicated about the DMRS locations among other parameters. For instance, the scheduling DCI may not follow slot based scheduling and instead be on a mini-slot level because of its location in time. Then there is dynamic switching between slot and mini-slot based scheduling. For this switching, additional indication for the scheduling DCI which is based on mini-slot basis will need DMRS signal locations. For slot-scheduling DMRS is front-loaded. For mini-slot/symbol level scheduling for the case of scheduling DCI DMRS locations have to be indicated either via RRC or L1 signaling. Since this BWP activation etc. happens on a fast scale via L1 signaling, it is preferred that this signaling also follows L1 based. Having separate scheduling DCI can easily help to schedule several BW parts without much overhead—from forward compatibility perspective it seems better, this overhead can be more and may overload the L1 signaling. Hence, considering the overhead, joint DCI for both scheduling and switching may be preferable.

Search Space Configurations Parameters Across BWPs

Parameters such as CCE, CCE-REG mapping, REG bundle, REG interleaving etc. may be assumed to be same by the UE across BWPs. Else they will be indicated via UE specific signaling. In order to maintain some signaling overhead reduction, only the parameters changed across the BWPs may be indicated to the UE. Hence, some parameters may be same across BWPs and some parameters may be different. The following may be indicated to UE separately for CSS and USS CORESETs (control resource sets).

For a given search space—a) CORESET parameters are same across all BWPs b) some CORESET parameters are common across BWPs and c) none of the CORESET parameters can be assumed to be same across BWPs. Option c (none of the CORESET parameters can be assumed to be same across BWPs) will require additional signaling whenever a CORESET is configured in a BWP and may be avoided for faster L1 signaling to support BWP activation/de-activation/adaption etc.

Another UE behavior may be defined as follows for the case of CORESET parameters across BWPs (both for CSS and USS)
  a) Behavior 1: Assume same irrespective of numerology and BWP configurations
  b) Behavior 2: Assume same only if the numerology of BWPs are same irrespective of other BWP configurations
  c) Behavior 3: Assume different configurations irrespective of numerology or BWP size or etc.
  d) Behavior 4: Assume same only if the numerology of BWPs and the BWP sizes are same
  e) Behavior 5: Assume same only if the numerology of BWPs are same but the BWP size is different f) Behavior 6: Assume same only if the size of BWPs are same but the numerology is different g) Behavior 7: Assume same only if the starting location of the BWPs is same irrespective of other parameters h) Behavior 8: Assume same only if the starting location of the BWPs and size of BWPs is same irrespective of other parameters i) Behavior 9: Assume same only if the starting location of the BWPs and numerology of BWPs is same irrespective of other parameters Switching and Scheduling DCI—Separate DCI vs. Joint DCI for BWP activations for cross BWP scheduling Single DCI for switching+scheduling
  1 long DCI format
Separate DCI for switching and scheduling
  2 small DCI formats This design impacts detection probability, complexity and UE implementation/power consumption and flexibility of scheduling the BWPs.

Long DCI format can be
  more reliable and better detection performance
  Saves CRC check for the UE and reduces CRC overhead
  Saves resource and spectral efficiency
  Less flexible as to change some small parameters; one of the shorter DCI formats may remain same and indicated to UE while only the scheduling DCI may be changed. But in longer DCI format entire thing needs to be changed and again decoded by the user.
  For polar codes, longer DCIs are better as they can benefit from coding gains (i.e. 'overhead' per bit sent is lower for longer DCIs (and of course, the same applies for the CRC overhead). There is some power benefit from the shorter DCI but relative to the overall UE power consumption for blind decoding's, it is probably rather negligible—may depend on implementation if there is any at all and may be same as long DCI formats.

Short DCI formats (2 of them separate for scheduling and switching)
  More blind decodes if the 2 DCI formats are of different size
  More blind decodes if both of them are in different BWP
  BD (blind decode) can be maintained if the location of one of them is fixed; indicated via another for which BD is done
  BD can be maintained if same size of each DCI with one extra bit to identify which DCI is what, but both these should be inside the same BWP
  More flexible as compared to longer DCI format Therefore configuration of the long DCI format i.e., joint DCI format for switching and scheduling versus separate DCI format individually for each of them can be configurable by the gNB signaling to the UE. This can be per UE, depending on BWP (i.e., BWP specific), frequency specific, and BW size specific configurations among others.

Figure 15:
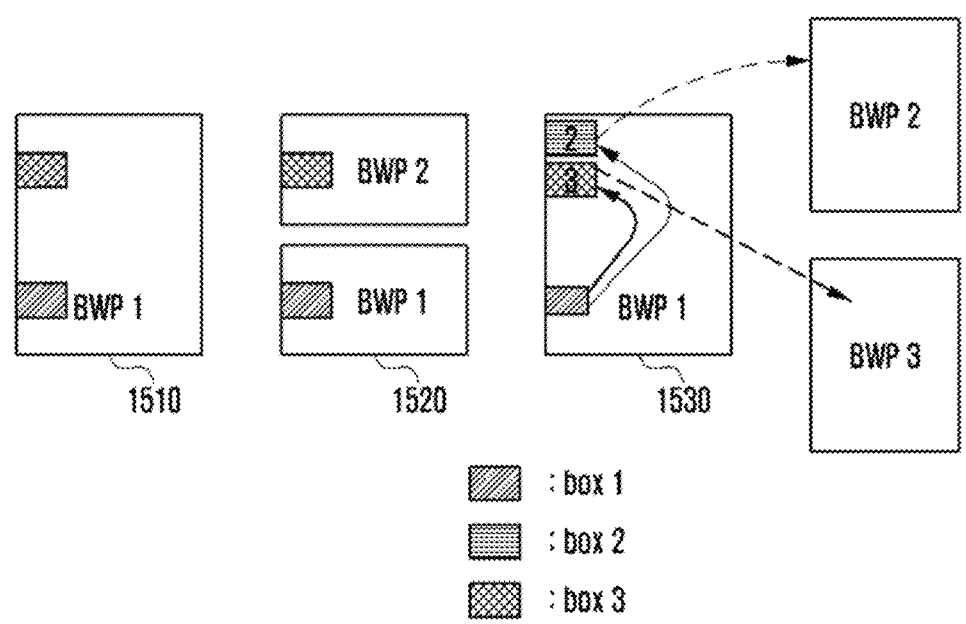
FIG. 15 illustrates another embodiment of activating multiple bandwidth parts according to the proposed invention.

There are few mechanisms to reduce the blind decoding overhead for the case of the separate DCI formats For a long DCI format
  A start CCE index may be configured within every BWP if the UE needs to be scheduled on some other BWP
  If UE finds something at a specific CCE index x start location; then it can be interpreted as the scheduling information for the BWP x
  Multiple BWP can be scheduled with PDCCH mapped to 2 candidate CCE locations (i) and (j)
  If none of the candidate locations (mentioned above) have a probable DCI format OR have all 0's present in those locations; then that means the same BWP is used for scheduling and no switching is needed For short DCI formats with separated DCI
  Linking scheduling DCI location via switching DCI reduces blind decodes i.e., once a switching DCI is found via BD mechanisms, the UE will know where in the target BWP the UE must look for the scheduling DCI
  Fixed location of scheduling DCI for a given BWP depending on the BWP identifier which can be explicit id or start RB index or center frequency of the BWP FIG. 15 illustrates another embodiment of activating multiple bandwidth parts according to the proposed invention. In FIG. 15, box 1 indicates the switching DCI; boxes 2 and 3 indicate the scheduling DCI for different BWP. Fixed locations for the box 2 and 3 based on BWP are being used for scheduling and indicated via switching DCI i.e., box 1. For example to switch to BWP2, UE will go and check a fixed box 2 location and for BWP3 to switch UE will go and monitor the box 3 location. If some data found regarding the 2nd location, UE will switch to BWP2 and use the scheduling information found there. In the FIG. 15 three techniques are shown wherein the 1st figure on left side (FIG. 15(a)), the switching and scheduling DCI are both inside the same BWP which happens when the switching DCI does not indicate anything to the UE for switching. For the middle figure (FIG. 15(b)), the switching DCI directly indicates the UE to go to a different BWP and then UE reads scheduling DCI inside that BWP. For the right side figure (FIG. 15(c)), switching and scheduling DCI are in same BWP but the scheduling DCI for different BWP is located at some pre-defined locations based on which UE will use it in next time instant.

Figure 16:
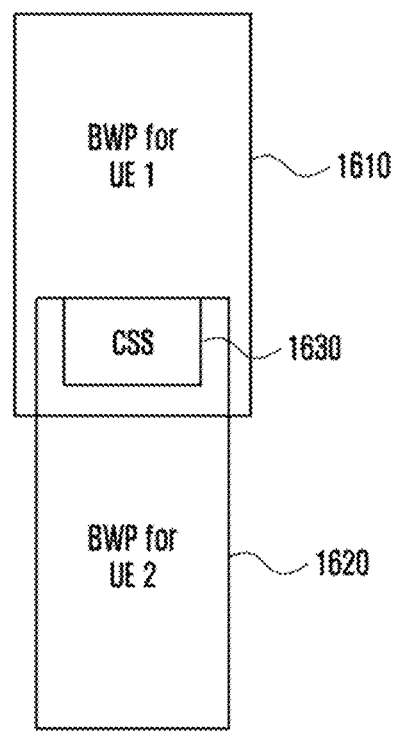
FIG. 16 illustrates another embodiment of activating multiple bandwidth parts according to the proposed invention.

For the case of BWP scheduling including cross-BWP scheduling; following DCI formats may be considered:

a) Long DCI format containing switching and scheduling indications of target BWP b) Separate DCI format for scheduling and switching wherein
  1. Scheduling and switching DCI are in source BWP and
    1.1 Switching DCI explicitly points to the location of scheduling DCI
    1.2 Switching DCI indicates BWP id and this id can be used to identify location of scheduling DCI for the target BWP; id can be center frequency, start RB location or explicit ID based on all the BWP configured to a UE
  2. Switching DCI is in source BWP and scheduling DCI is in target BWP; this scheduling DCI location inside the target BWP can be blindly decoded or explicitly indicated to the UE via switching DCI CORESET Configurations FIG. 16 illustrates another embodiment of activating multiple bandwidth parts according to the proposed invention. Various CORESET configurations can be defined considering different numerologies as shown in FIG. 16.

CORESET configuration for MIB in SI

CORESET configuration for paging and RAR (random access response) in RMSI (remaining system information)

Same CORESET configurations for entire initial access
CORESET configuration for paging indicated via RACH (random access channel) procedure
CORESET configuration for CSS/USS for connected mode UE indicated via
  RRC indicate to UE about CSS/USS numerology and location
  USS/CSS has fixed numerology irrespective of BWP
    USS/CSS parameters can be fixed (OR)
      USS/CSS configuration parameters other than numerology are indicated by RRC When the CSS (1630) and PDSCH (1610, 1620) have different numerologies as shown in FIG. 16, rate matching of PDSCH must be done along with guard subcarriers if needed to support any leakage across the different numerologies. In the FIG. 16 shown are the BWP for different UEs (1610, 1630) which are overlapping and configured with different numerologies. These numerologies could be different from the numerology configured for the case of the search space. The gNB to UE signaling is shown in the flow chart below and the decision making procedure is also indicated in the flow chart shown in FIG. 17.

Figure 17:
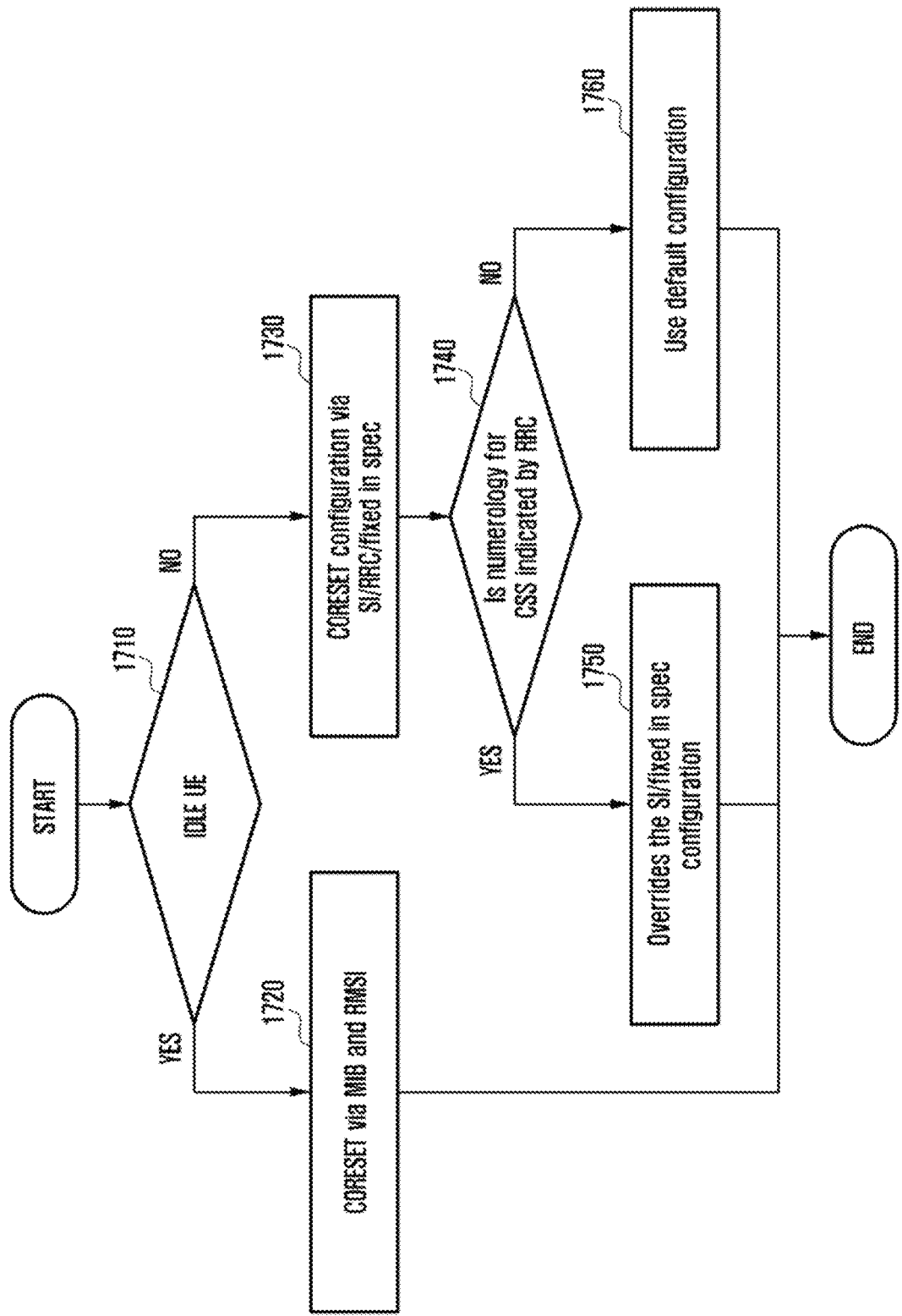
FIG. 17 illustrates a flow chart of configuring a control resource set according to the proposed invention.

FIG. 17 illustrates a flow chart of configuring a control resource set according to the proposed invention. For a UE in idle state (1710), a CORESET can be configured via MIB (master information block) and/or RMSI (1720). Or, a UE which is not in idle state, i.e., RRC connected or RRC inactive state, a CORESET can be configured via SI/RRC signaling from a gNB, or the CORESET can be fixed in specification (1730). If a numerology for a CSS is indicated by RRC (1740), the UE overrides the configuration of SI/RRC/fixed specification (1750). However, a numerology for a CSS is not indicated by RRC signaling, the UE uses default configuration for a CSS (1760).

For the case of multiple active BWPs, the possibility of a CORESET being split across the multiple active BWP can be explored. For instance the gNB can configure the number of blind decodes per BWP. Some of the AL (aggregation level)'s (for example 1 and 2) can be configured only in one BWP and some of the remaining AL's (for example 4 and 8) can be configured in another BWP. If decoding succeeds in some AL, then the UE need not look in another BWP.

UL BWP Configuration

Figure 18:
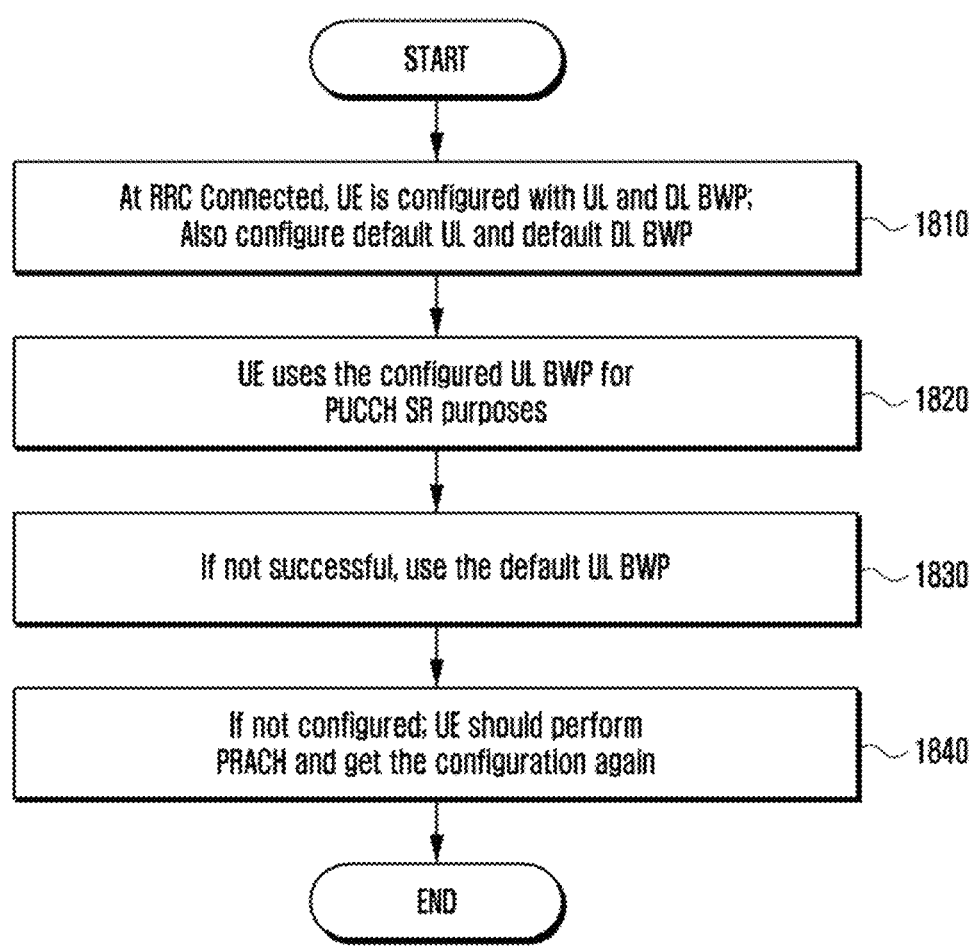
FIG. 18 illustrates a flow chart of configuring an uplink bandwidth part according to the proposed invention.

FIG. 18 illustrates a flow chart of configuring an uplink bandwidth part according to the proposed invention.

One of the main questions to answer is when the UL BWP is configured to a user. For the case of PRACH (physical random access channel), the resources are already indicated to the user via RACH configuration (1810). The next time UL BWP is needed is for the PUCCH (physical uplink control channel) to send SR (scheduling request) when UE has UL data to send (1820). Else the UE will receive any other configuration via the UL grant. Hence, the earliest stage when the UE needs UL BWP configuration is via the RRC connection setup configuration. Before that UL BWP configuration is not needed. A default UL BWP may be defined to the user which it can use for purposes where no UL configurations are indicated to the UE (1830). Else, it can send PUCCH on the BWP configured with PUCCH resources. If the default UP BWP is not configured, UE should perform PRACH and get the configuration for the UL BWP again (1840).

The various locations where UE is indicated the UL BWP configurations are:
a) MIB
b) RMSI
c) RACH Configuration
d) RAR
e) Msg4
f) RRC Connection Setup Via RRC connection setup seems preferable and sufficient. At least default UL BWP configurations can be done via these above channels.

Figure 19:
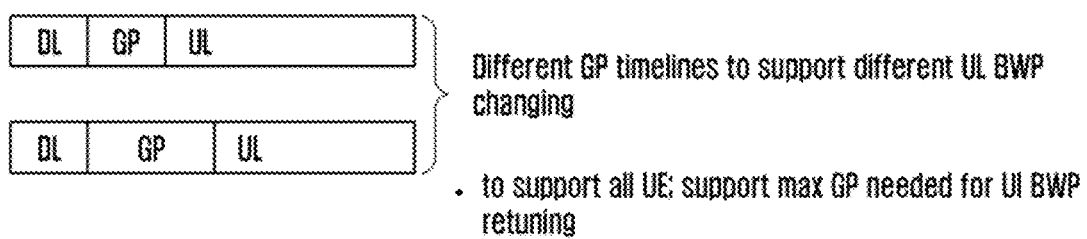
FIG. 19 illustrates an embodiment of configuring an uplink bandwidth part in TDD system according to the proposed invention.

For TDD mode; if UL BWP is different/changes from the DL BWP; then the GP between DL to UL should include additional time to allow for retuning/changing BWP and the TA value difference. For same BWP center frequency, the GP can be less time. For different BWP center frequency GP time should be more. To account for all; UE capability information based GP be designed and indicated to UE. But since frame structure should support all NR UE; assume a max change in re-tuning timeline and design GP based on the max time needed for UL BWP changing. FIG. 19 illustrates the above described embodiment of configuring an uplink bandwidth part in TDD system according to the proposed invention.

PUCCH resources in a BWP can be located anywhere inside the BWP for CP-OFDM waveform and edges of the BWP for the case of DFT-s-OFDM waveform in order to maintain the single carrier properties. PUCCH frequency hopping may be supported within and across BWPs. The PUCCH resources can be identified within the same BWP (if the UL and DL BWPs are same) by using a parameter $n_{CCE}$ similar to LTE which is indicating an offset from the PDCCH configured in that BWP. For the case of the different BWP, this offset can include the BWP id and then an offset form the starting RB location of the UL BWP. Hence following mechanisms can be used for indicating the PUCCH resources via a formula similar to the equation 4 below:

$$n^{(1)}_{PUCCH} = n_{CCE} + N^{(1)}_{PUCCH} \quad \text{[equation 4]}$$

$N^{(1)}$ PUCCH is the statically configured resources typically used for formats 2/2a etc. For the rest of PUCCH resources, the UE can be indicated via one of the following mechanisms:
a) Within the same BWP use LTE mechanism, offset form PDCCH location via $n_{CCE}$ and $N^{(1)}_{PUCCH}$ indicated by higher layer signaling.
b) Across BWPs, the offset $n_{CCE}$ can be expressed from PDCCH within the source BWP and the start RB index of the target BWP
c) Across BWPs, $n_{CCE}$ indicates the offset from the start RB index of target BWP
d) Explicit offset indication to the UE via RRC/L1

Figure 20:
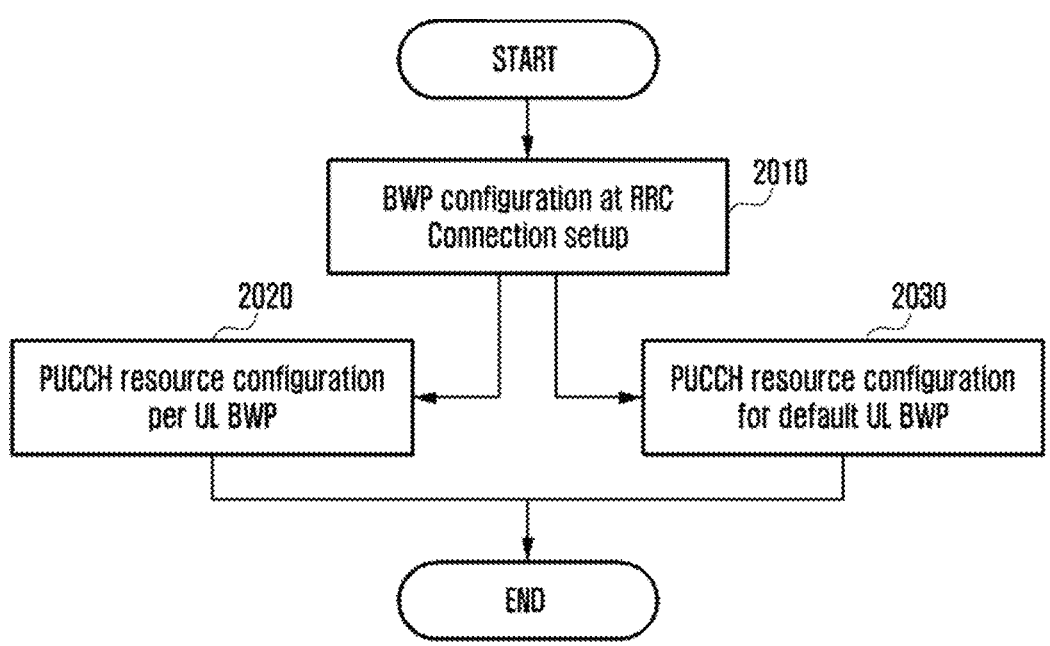
FIG. 20 illustrates a flow chart of configuring an uplink bandwidth part according to the proposed invention.

FIG. 20 illustrates a flow chart of configuring an uplink bandwidth part according to the proposed invention.

The number of RB's that can be used for PUCCH transmission within a BWP is determined by $N^{PUCCH}_{RB}$ which can be configured at RRC connection setup stage since BWP is configured to UE only then (2010). This parameter can be BWP specific. More specifically, this is configured per UL BWP. A single UE is given multiple PUCCH resources—a standard PUCCH resource and an SR PUCCH resource per UL BWP (including default UL BWP) (2020, 2030). Standard PUCCH resource is used when HARQ (hybrid automatic repeat request) is transmitted without SR and SR PUCCH resource is used when sending SR with/without HARQ per BWP. The number of statically reserved PUCCH resources are configured per BWP and indicated via RRC signaling along with BWP configuration to a UE. For PUCCH formats which transmits HARQ feedback for a PDSCH transmission on the BWP where there is no corresponding PDCCH detected (as in the SPS case), instead of nCCE and n1PUCCH-AN, N1PUCCH-AN-Persistent should be used for determining PUCCH resources. It is one value out of 4 N1PUCCH-AN-PersistentList which is based on TPC (transmission power control) command received in the DCI format and indicates a semi-persistent downlink scheduling activation.

BWP are configured in UE specific manner Hence PUCCH sharing may not be necessary for the users when BWP are configured in such a manner. However, when BWP overlap across users, then UE's can share the PUCCH RB's but the combination of orthogonal codes and cyclic shift is unique for each UE via a parameter $n^{(1)}_{CS}$. This sharing may be necessary only when DFT-s-OFDM is used as they may be configured at edge of the BWP for single carrier properties sake and such a region may overlap with other users in case of BWP overlapping. However for CP-OFDM waveform as in short-PUCCH case, the resources can be multiplexed without any issue.

Following is an example for RRC Connection Reconfiguration message:

```
message c1 : rrcConnectionReconfiguration : {
.......
cqi-ReportPeriodic setup : {
cqi-PUCCH-BWPIndex
cqi-PUCCH-ResourcePerBWPIndex
cqi-PUCCH-DefaultBWPIndex
cqi-PUCCH-ResourcePerDefaultBWPIndex
cqi-PUCCH-ResourceIndex 12,
cqi-pmi-ConfigIndex 8,
cqi-FormatIndicatorPeriodic widebandCQI : NULL,
ri-ConfigIndex 483,
simultaneousAckNackAndCQI TRUE
}
},
 .....
schedulingRequestConfig setup : {
sr-PUCCH-BWPIndex
sr-PUCCH-ResourcePerBWPIndex
sr-PUCCH-DefaultBWPIndex
sr-PUCCH-ResourcePerDefaultBWPIndex
sr-PUCCH-ResourceIndex 0,
sr-ConfigIndex 97,
dsr-TransMax n4
}
}
}
```

This message shows how the PUCCH resources may be configured to UE per BWP, within default BWP, or in a generic fashion.

For the case of PUSCH (physical uplink shared channel) configurations, a UE may be configured for frequency hopping within a BWP and across BWP. For hopping therefore a UE is configured with 2 parameters as ($N_{RB}^{HO}$ and $N_{BWP}^{HO}$) which indicate the hopping RBs within a BWP and the BWP to which the UE should hop to. Instead if $N_{SB}$ in LTE, it will be needed to configure the BWP id to which the UE will hop to. The following message may be configured to the UE as part of RRC configuration settings since BWP will be configured to UE here:

```
| | +-pusch-ConfigBasic ::= SEQUENCE
| | | +-n-BWP-HO ::= INTEGER
| | | +-n-RB-HO ::= INTEGER
| | | +-hoppingMode ::= ENUMERATED [interSubFrame]
| | | +-pusch-HoppingOffset ::= INTEGER (0..98) [4]
| | | +-enable64QAM ::= BOOLEAN [FALSE]
```

The following hopping types can be supported across slots/symbols/mini-slots:
  Type 1: Frequency offset between the first time instant and the second time instant is explicitly determined by DCI. This can be within BWP or across BWP and depends on the number of RBs within and across BWPs.
  Type 2: Frequency offset between the first time instant and the second time instant is configured by a predefined pattern. When there is multiple BWPs, hopping is done from one BWP to another BWP.

Some options can exist for PUCCH configuration as indicated by the gNB configuration:
  a) PUCCH can be configured on all BWPs and this PUCCH can be used whenever there is specific BWP is activated for sending the UCI (uplink control information). If PUSCH is also configured for the same BWP then PUSCH and PUCCH can be sent together. However if DFT-s-OFDM is used, then gNB can avoid configuring separate PUCCH and PUSCH regions inside the same BWP for maintaining the single carrier property.
  b) PUCCH is configured on only some BWPs or some fixed BWs (like a default BWP). Then when PUSCH is configured on some BWPs without PUCCH, then UCI is sent on PUSCH with gNB configuration.

PUCCH configuration parameters within a BWP can be assumed to be same by the UE to save signaling overhead, and if the PUCCH resource for HARQ-ACK is indicated by RRC signaling and/or L1 signaling, one PUCCH configuration is enough, the PUCCH configuration within any BWP is the same, at least for the ones with same numerology. At least some parameters for PUCCH configuration can be same for BWPs which have different numerology. For BWP with same numerology and different sizes, only exact location can change but the parameters remain same. This can be configured by the network to the UE. This can be done at RRC connection setup phase.

UL RBG Size Calculation

The UL RBG (resource block group) size will be
  a) Indicated by DCI
  b) Fixed based on UL BWP size
  c) Based on a bitmap which can be used across multiple BWP; size of bitmap is fixed by DCI The uplink resource block groups of size P are numbered $n_{RBG}=0, \ldots, N_{RBG,BWP}^{UL}-1$ in order of increasing physical resource-block number where uplink resource block group $n_{RBG,BWP}$ is composed of physical resource-block indices within a BWP indexed as BWP in the equation shown. This equation can be written per UL BWP. $n_{RBG,BWP}$ contains PRBs indexed as shown in equation 5 below per BWP configured for the UL cases.

$$\begin{cases} P \cdot n_{RBG,BWP} + i_0 + i & \text{if } N_{RB,BWP}^{UL} \bmod 2 = 0 \\ P \cdot n_{BBG,BWP} + i_0 + i & \text{if } N_{RB,BWP}^{UL} \bmod 2 = 1 \text{ and } n_{RBG,BWP} < N_{RBG,BWP}^{UL}/2 \\ P \cdot n_{RBG,BWP} + i_0 + i + 1 & \text{if } N_{RB,BWP}^{UL} \bmod 2 = 1 \text{ and } n_{RBG,BWP} \geq N_{RBG,BWP}^{UL}/2 \end{cases} \quad \text{[equation 5]}$$

where $i = 0, 1, \ldots, P-1$ $$i_0 = \left\lfloor \frac{N^{UL}_{RB,BWP}}{2} \right\rfloor - \frac{P \cdot N^{UL}_{RBG,BWP}}{2}$$

SRS Configuration

A UE shall transmit Sounding Reference Symbol (SRS) on per active UL BWP SRS resources based on two trigger types:

trigger type 0: higher layer signaling
trigger type 1: DCI formats specific for FDD/TDD or frame structure In case both trigger type 0 and trigger type 1 SRS transmissions would occur in the same slot/symbol in the same BWP, the UE shall only transmit the trigger type 1 SRS transmission on that BWP.

The SRS transmission BW is configured by higher layers per BWP. The transmission and measurement BW for SRS can be different within a BWP. The SRS transmission slots/symbols are configured by higher layers. A UE configured for SRS transmission on multiple antenna ports and for a same UL BWP shall transmit SRS for all the configured transmit antenna ports within symbol/slot configured by higher layers and the SRS transmission bandwidth and starting physical resource block assignment within the BWP and the BWP itself are the same for all the configured antenna ports.

For a UE not configured for PUSCH/PUCCH transmission, the UE shall not transmit SRS whenever SRS transmission on the active BWP and PUSCH/PUCCH transmission carrying HARQ-ACK/positive SR/RI (rank indicator)/PTI (precoding type indicator)/CRI (csi-rs resource indicator) and/or PRACH happen to overlap in the same symbol and that can result in uplink transmissions beyond the UE's indicated UL BWP capability (i.e., how many BWP can UE handle simultaneously) included in the UE-EUTRA-Capability. This capability can be within 1 numerology or even across numerologies.

The parameter srs-ConfigIndex-per-BWP tells the UE about the SRS transmission periodicity per configured BWP and depending on the active BWP, the UE can transmit the SRS within the configured BW. The following configurations for SRS may be configured along with BWP configuration for the UE—

```
+-soundingRS-UL-ConFigDedicated ::= CHOICE [setup] OPTIONAL:Exist
    +-setup ::= SEQUENCE
        +-srs-BandwidthConfig-perBwp ::= ENUMERATED [bw0]
        +-srs-HoppingBandwidth-perBWP ::= ENUMERATED [hbw0]
        +-freqDomainPosition-perBWP ::= INTEGER (0..23) [0]
        +-srs-Periodicity-perBWP ENUMERATED [sc0]
        +-duration-perBWP ::= BOOLEAN [FALSE]
        +-srs-ConfigIndex ::= INTEGER (0..1023) [0]
        +-transmissionComb-perBWP-BWsize ::= INTEGER (0..1) [0]
        +-cyclicShift ::= ENUMERATED [cs0]
```

The transmission comb, UE-specific parameter transmissionComb or transmissionComb-ap for periodic and each configuration of aperiodic transmission, respectively, provided by higher layers for the UE, and can depend on the BW size of the BWP over which the UE will send the SRS signaling. Depending on whether the configured BWP is used by other users, the transmission comb may be applied or not by the gNB. Even for the case of partially overlapping BWP, the gNB may take a decision on the same. An example SRS BW configuration can be indicated as table 1 below, depending on the size of BWP configured for the SRS transmission. Table 1 shows SRS configuration based on a BWP and its size (BWP_size), when $m_{SRS,b}$ and $N_b$, b=0, 1, 2, 3.

TABLE 1

| SRS bandwidth configuration | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | X1 | N01 | Y1 | N11 | Z1 | N21 | U1 | N31 |
| 1 | X2 | N02 | Y2 | N12 | Z2 | N22 | U2 | N32 |
| 2 | X3 | N03 | Y3 | N13 | Z3 | N23 | U3 | N33 |
| 3 | X4 | N04 | Y4 | N14 | Z4 | N24 | U4 | N34 |
| 4 | X5 | N05 | Y5 | N15 | Z5 | N25 | U5 | N35 |
| . | . | . | ... | . | . | . | . | . |
| . | . | . | | . | . | . | . | . |
| . | . | . | | . | ... | . | . | . |
| . | . | . | | . | . | . | . | . |
| N | Xn | N0n | Yn | N1n | Zn | N2n | Un | N3n |

The frequency hopping parameter can be configured per BWP in a UE specific manner Aperiodic SRS may be triggered per BWP by the PDCCH DCI. The DCI signaling can indicate the:
srsBWP
srsTransmissionBW as example parameters for the transmission of the SRS on a specific BWP. A UE configured for Aperiodic SRS transmission upon detection of a positive SRS request in slot #n shall commence SRS transmission in the first slot satisfying slot #n+k, k≥X; where X is fixed in specification or configured by gNB based on UE capability, the UL BWP size, retuning limits etc, and based on the Aperiodic SRS time domain configuration. In case both periodic and aperiodic SRS transmissions would occur in the same slot/symbol within a BWP, the UE shall only transmit the Aperiodic SRS. A UE will not transmit SRS whenever SRS and a PUSCH transmission corresponding to a RAR grant or a retransmission of the same TB (transmission block) as part of the contention based RA procedure coincide in the same slot/symbol and within a configured BWP.

Within a BWP UE may be configured srsTranmsisionBW and specifically to support wideband SRS (entire BWP) or narrowband SRS (within different regions of BWP).

PUSCH Indication for RACH

RAR indicates the PUSCH allocation for the UE. This allocation can be dictated as an offset form the SS block used by the UE or from the RMSI location or from the RAR location of PDSCH etc. If it is different BWP, additional indication of the BWP offset along with RB offset may be indicated to the UE. Explicit BWP need not be configured for the UE.

Other BWP Issues

In the embodiments presented here, embodiments of solutions are described for issues related to re-transmissions across bandwidth parts, numerologies used, HARQ procedures for the same, configurations for BWP for carrier aggregation and some operations.

Re-transmissions across BWP should be allowed by the gNB configuration to a UE. A gNB may activate different and wider BWP compared to first transmission because the size of the transport block size can be same or difference in time due to larger resource block allocations. A UE may be configured a wider BWP for retransmission as compared to initial transmission. Adaptive HARQ procedures can be supported for 5G systems wherein the PDCCH configuration is supported and indicates the configuration for the retransmission. This can also include BWP for the case of retransmission being different from initial one.

Retransmission from one BWP to another may involve a) same numerology BWP for 1st transmission and retransmission and b) different numerology for the 1st transmission and retransmission. This can be valid for any retransmission and not just the 1st retransmission. When numerology is changing across BWP, then HARQ procedure is shared across numerologies. The time lag between the PDSCH and HARQ timing follows numerology of the BWP wherein HARQ will be transmitted. When numerology are different between PDCCH and the scheduled transmission of the PDSCH which can be on a different BWP, the time granularity indicated in the DCI for the timing relationship between the end of PDCCH and the corresponding scheduled transmission on a different BWP is based on the numerology of the scheduled transmission i.e., the activated BWP for this transmission. The time granularity of a HARQ-ACK transmission, indicated in the DCI scheduling the PDSCH, is based on the numerology of PUCCH transmission which is configured in a specific BWP and follows the BWP used for PUCCH transmission. The numerology for the PUCCH transmission is determined based on the UL BWP configured for the user and indicated to the UE.

Figure 21:
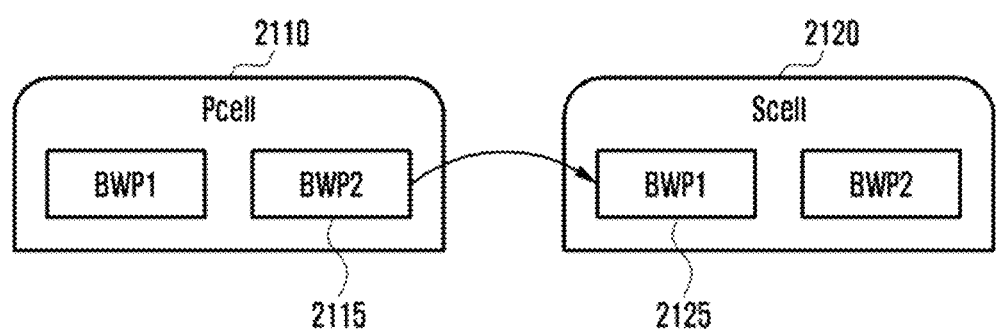
FIG. 21 illustrates an embodiment of a relationship between bandwidth parts of pcell and scell according to the proposed invention.

FIG. 21 illustrates an embodiment of a relationship between bandwidth parts of Pcell (primary cell, 2110) and Scell (secondary cell, 2120) according to the proposed invention. Cross BWP scheduling simultaneously with cross carrier scheduling will be supported for 5G systems via gNB configuration. In other words if BWP (e.g., BWP2, 2115) is configured per carrier; then scheduling should account for same. Hence, the cross carrier scheduling will now have to indicate the carrier identity via CIF (carrier indicator field)/ARFCN (Absolute Radio Frequency Channel Number). The BWP configurations for the target cell have to be indicated to the UE via Scell addition procedure. Then the scheduling will have to be indicated to the UE in terms of the BWP identification of the target cell (e.g., BWP1, 2125 of Scell 2120). The timing will follow the timing of the BWP configured on the Scell (PDCCH to PDSCH delay).

Scell measurements, Scell feedback etc will happen based on the BWP configurations obtained. Initial configurations are via Pcell. Initial configuration can be changed to RRC signaling on Scell for later stages. CSI-RS measurements for the Scell will be done within the BWP activated for the UE. For reliable measurements, a UE may be configured with the full Scell BW for full measurements if only CSI-RS measurements are to be relied on.

PRB Indexing

Common and UE specific indexing are needed for different purposes to support wideband operations in 5G systems. Common indexing is good for supporting BWP configuration, reference signal generation, search space configurations for the group common PDCCH among others. The UE specific indexing is good for UE specific search space, UE specific resource allocation, among others.

Common PRB indexing is based on a numerology which can be one among the following options:
Numerology of the SS block/PBCH used for that carrier and the UE used for camping on the cell
Numerology of RMSI in case it is different from the SS block
Numerology indicated via RRC connection setup
Numerology indicated via RMSI
Numerology indicated via PBCH
Numerology indicated via L1 signaling, in case dynamic indication is supported
In case of multiple SS blocks present inside a wideband carrier, then the numerology of the default SS block may be assumed by the UE
In case of multiple SS blocks present inside a wideband carrier, then the numerology of an SS block indicated by the gNB to the user can be used for indexing.
Numerology indicated via Msg4 in RACH procedure, if supported Depending on the gNB configuration, one of these options may be configured by the gNB to a UE. If none of them is explicitly indicated, the UE can use the default numerology of the SS block it used for camping on the cell.

When multiple SS blocks exist in the wideband, the reference point—should be common across all SS blocks in order to support common operations across the whole of wideband the UE is monitoring. Since the same UE is monitoring the entire wideband and multiple SS blocks, it is crucial to support common indexing. This common indexing must be supported from a reference location. This reference location can be an SS block, RMSI location, center of wideband carrier, center of a narrow band carrier among others. Considering that different users find different SS blocks inside a wideband, a common location is preferred across these SS blocks for indexing in order to avoid mismatch among different UEs about the mapping for RS, BWP configuration and search space configurations. This common location be indicated to the UE via:

PBCH
   If needed for RMSI decoding; such as tracking RS;
      Else if PDCCH DMRS is sufficient for SIB decoding etc. then no need RMSI
   If needed for PRACH procedure such as PRACH region; RAR decoding etc.
      But RAR decoding CORESET same as initial access→no more indication
      PRACH region→indicated as offset from RMSI location; no special care needed
      RMSI PDCCH indicates PDSCH and hence this indication is inside the PDSCH for RMSI Via PRACH Msg4 after contention resolution
Via OSI—other system information/on-demand system information when a UE can request for the same
RRC Connection establishment
   CSI-RS necessity; PDCCH; BWP configuration are done only after this stage
   Really needed post this stage in connection establishment
   Seems this is enough
Via RRC signaling
   Can be changed in online manner based on number of UE etc by the gNB
   Signaling semi-static manner to UE The reference point can be center of wideband carrier as it will be common for all the potential SS blocks in this wideband spectrum.

Supporting Carriers without SS Blocks
Potential Deployment Setting—Intra-band non-contiguous CA (carrier aggregation)

Figure 22:
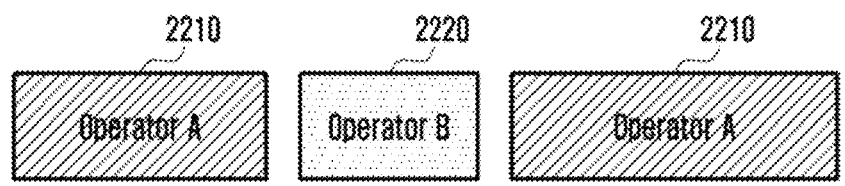
FIG. 22 illustrates an embodiment of supporting carriers without synchronization signal blocks according to the proposed invention.

FIG. 22 illustrates an embodiment of supporting carriers without synchronization signal blocks according to the proposed invention. The FIG. 22 shows a potential deployment setting wherein operator A has non-contiguous spectrum (2210). A typical operating setting for this situation is intra-band CA. However the conventional LTE mechanism forces each part of the Operator A's spectrum (2210) to carry an synch signal and each will be configured as a cell namely Pcell and Scell. However, there may be some cases wherein one part of the Operator A's spectrum (2210) may not be able to support a SS signal due to another operator B's spectrum (2220) between the aggregated spectrum bands. In another case when the intraband CA can be supported by using 1 RF chain, the presence of multiple synch signals in each part of the spectrum is not obvious and also deemed waste of resources. In such cases, it was deemed feasible to support a carrier with synch signals and hence this calls for a non-traditional CA operational scenario.

Since SS signals are not supported, this carrier cannot be treated for initial access and cannot exist in stand alone mode. It is only activated by the Pcell and but it can be configured and used as a Scell. However no mobility is supported on same via SS signals. However, for 5G systems CSI-RS signals are also configured and can support L3 mobility measurements. The timing reference for this CSI-RS for such a carrier can be inferred from the SS signals of the primary carrier. The measurements needed for addition of this Scell can be either CSI-RS measurements or the gNB can blindly configure the same for a UE. RRC signaling can be used to configure the CSI-RS measurements and provide any feedback between UE and gNB for this carrier. CSI-RS configuration for inter-frequency measurement can be used to measure the RSRP or cell quality of a carrier without SS block, if network requires measurement results before SCell addition.

Such a carrier has no cell-Id and all indication for this Scell will be via carrier indicator field which is made of the ARFCN of this carrier. The configured CSI-RS can be used for Scell addition and release similar to the regular CA framework. Beam management etc. may be supported on this carrier/Scell via use of CSI-RS only. In order to satisfy the measurement accuracy obtained via SS blocks, the CSI-RS configuration such as time and frequency density for this Scell (without SS block) can be different from the Pcell. Note that a UE cannot camp on this cell without the Pcell and is not self-discoverable.

Figure 23:
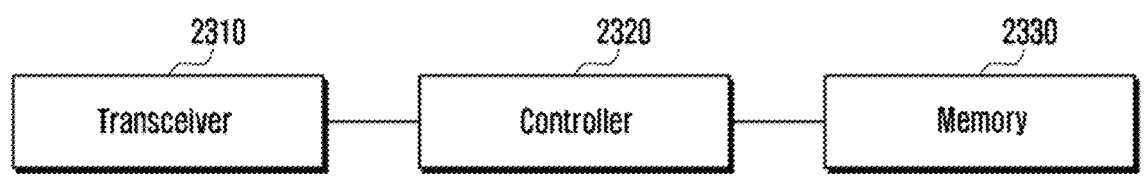
FIG. 23 illustrates a terminal according to an embodiment of the proposed invention.

FIG. 23 illustrates a terminal according to an embodiment to the present disclosure.

Referring to FIG. 23, the terminal (2300) includes a transceiver (2310), a controller (2320) and a memory (2330). The terminal (2300) in FIG. 23 may be referred to as a user equipment (UE). Alternatively, the transceiver may be implemented as a transmitter and a receiver, and each component may be implemented through one or more processors.

Figure 24:
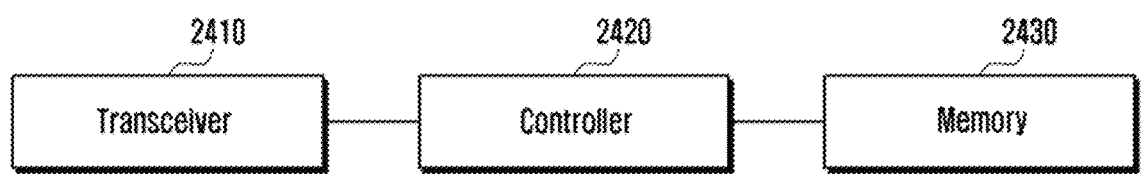
FIG. 24 illustrates a base station according to an embodiment of the proposed invention.

FIG. 24 illustrates a base station according to an embodiment of the present disclosure.

Referring to FIG. 24, the base station (2400) includes a transceiver (2410), a controller (2420) and a memory (2430). The base station (2400) in FIG. 24 may be referred to as a eNB, a gNB or a TRP (transmission and reception point). Alternatively, the transceiver may be implemented as a transmitter and a receiver, and each component may be implemented through one or more processors.

The above-described embodiments of the present disclosure and the accompanying drawings have been provided only as specific examples in order to assist in understanding the present disclosure and do not limit the scope of the present disclosure. Accordingly, those skilled in the art to which the present disclosure pertains will understand that other change examples based on the technical idea of the present disclosure may be made without departing from the scope of the present disclosure.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

The invention claimed is:

1. A method of receiving downlink data by a terminal in a wireless communication system, the method comprising:
   receiving, from a base station, a message including first information on a time domain position for a synchronization signal block (SSB) in a SSB burst and second information on a periodicity for the SSB;
   determining whether an allocated resource on a physical downlink shared channel (PDSCH) overlaps with a resource for the SSB, based on the first information and the second information;
   identifying at least one symbols where the SSB is transmitted, in case that the allocated resource overlaps with the resource for the SSB; and receiving, from the base station, downlink data on the allocated resource without the at least one symbols, by considering that a rate matching is performed on a resource in the least one symbols.

2. The method of claim 1, wherein a number of at least one SSBs in the SSB burst and a time domain position for each of the at least one SSBs are identified by the second information.

3. The method of claim 1, wherein the resource on which the rate matching is performed includes at least one physical resource blocks (PRBs).

4. The method of claim 1, wherein the message is received by a radio resource control (RRC) signaling used to configure a cell specific parameter of a serving cell for the terminal.

5. A method of transmitting downlink data by a base station in a wireless communication system, the method comprising:
    transmitting, to a terminal, a message including first information on a time domain position for a synchronization signal block (SSB) in a SSB burst and second information on a periodicity for the SSB;
    determining whether an allocated resource on a physical downlink shared channel (PDSCH) overlaps with a resource for the SSB, based on the first information and the second information;
    performing a rate matching on a resource in at least one symbols where the SSB is transmitted, in case that the allocated resource overlaps with the resource for the SSB; and
    transmitting, to the terminal, downlink data on the allocated resource without the at least one symbols.

6. The method of claim 5, wherein a number of at least one SSBs in the SSB burst and a time domain position for each of the at least one SSBs are identified by the second information.

7. The method of claim 5, wherein the resource on which the rate matching is performed includes at least one physical resource blocks (PRBs).

8. The method of claim 5, wherein the message is transmitted by a radio resource control (RRC) signaling used to configure a cell specific parameter of a serving cell for the terminal.

9. A terminal of receiving downlink data in a wireless communication system, the terminal comprising:
    a transceiver configured to transmit and receive a signal; and
    a controller configured to:
    receive, from a base station, a message including first information on a time domain position for a synchronization signal block (SSB) in a SSB burst and second information on a periodicity for the SSB,
    determine whether an allocated resource on a physical downlink shared channel (PDSCH) overlaps with a resource for the SSB, based on the first information and the second information,
    identify at least one symbols where the SSB is transmitted, in case that the allocated resource overlaps with the resource for the SSB, and
    receive, from the base station, downlink data on the allocated resource without the at least one symbols, by considering that a rate matching is performed on a resource in the least one symbols.

10. The terminal of claim 9, wherein a number of at least one SSBs in the SSB burst and a time domain position for each of the at least one SSBs are identified by the second information.

11. The terminal of claim 9, wherein the resource on which the rate matching is performed includes at least one physical resource blocks (PRBs).

12. The terminal of claim 9, wherein the message is received by a radio resource control (RRC) signaling used to configure a cell specific parameter of a serving cell for the terminal.

13. A base station of transmitting downlink data in a wireless communication system, the base station comprising:
    a transceiver configured to transmit and receive a signal; and
    a controller configured to:
    transmit, to a terminal, a message including first information on a time domain position for a synchronization signal block (SSB) in a SSB burst and second information on a periodicity for the SSB,
    determine whether an allocated resource on a physical downlink shared channel (PDSCH) overlaps with a resource for the SSB, based on the first information and the second information,
    perform a rate matching on a resource in at least one symbols where the SSB is transmitted, in case that the allocated resource overlaps with the resource for the SSB, and
    transmit, to the terminal, downlink data on the allocated resource without the at least one symbols.

14. The base station of claim 13, wherein a number of at least one SSBs in the SSB burst and a time domain position for each of the at least one SSBs are identified by the second information.

15. The base station of claim 13, wherein the resource on which the rate matching is performed includes at least one physical resource blocks (PRBs).

16. The base station of claim 13, wherein the message is transmitted by a radio resource control (RRC) signaling used to configure a cell specific parameter of a serving cell for the terminal.

* * * * *